US008785520B2

(12) United States Patent
Tsuboi et al.

(10) Patent No.: US 8,785,520 B2
(45) Date of Patent: Jul. 22, 2014

(54) PROCESS FOR PRODUCTION OF POLYLACTIC ACID RESIN COMPOSITION

(75) Inventors: Tomoya Tsuboi, Wakayama (JP); Akira Takenaka, Wakayama (JP); Masahiro Mori, Wakayama (JP)

(73) Assignee: Kao Corporation, Tokyo (JP)

( * ) Notice: Subject to any disclaimer, the term of this patent is extended or adjusted under 35 U.S.C. 154(b) by 0 days.

(21) Appl. No.: 13/522,648

(22) PCT Filed: Jan. 25, 2011

(86) PCT No.: PCT/JP2011/051307
§ 371 (c)(1),
(2), (4) Date: Jul. 17, 2012

(87) PCT Pub. No.: WO2011/096299
PCT Pub. Date: Aug. 11, 2011

(65) Prior Publication Data
US 2012/0296017 A1 Nov. 22, 2012

(30) Foreign Application Priority Data
Feb. 2, 2010 (JP) .................................. 2010-021475

(51) Int. Cl.
*C08K 9/04* (2006.01)
*C08K 9/10* (2006.01)
*C08L 67/04* (2006.01)
*C08K 5/521* (2006.01)
*C08J 3/20* (2006.01)
*C08K 5/00* (2006.01)

(52) U.S. Cl.
CPC .............. *C08J 3/201* (2013.01); *C08K 5/0083* (2013.01); *C08K 9/04* (2013.01); *C08K 9/10* (2013.01); *C08L 67/04* (2013.01); *C08K 5/521* (2013.01)
USPC ........................... 523/200; 523/210; 524/600

(58) Field of Classification Search
CPC ........ C08K 5/0083; C08K 5/521; C08K 9/04; C08K 9/10; C08L 67/04; C08J 3/201
USPC ............ 524/94, 132, 223, 127, 600; 523/200, 523/210
See application file for complete search history.

(56) References Cited

U.S. PATENT DOCUMENTS

| 2,325,979 | A | * | 8/1943 | Sarbach ....................... 524/145 |
| 7,652,085 | B2 | | 1/2010 | Takenaka et al. |
| 7,812,066 | B2 | | 10/2010 | Takenaka et al. |
| 8,106,112 | B2 | | 1/2012 | Takenaka et al. |
| 8,119,706 | B2 | | 2/2012 | Takenaka et al. |

| 2008/0262150 | A1 | | 10/2008 | Takenaka et al. |
| 2010/0210756 | A1 | | 8/2010 | Takenaka et al. |
| 2011/0124779 | A1 | * | 5/2011 | Whitehouse et al. ......... 524/101 |

FOREIGN PATENT DOCUMENTS

| JP | 2002-179899 | A | | 6/2002 |
| JP | 2003-12868 | A | | 1/2003 |
| JP | 2006-111703 | A | | 4/2006 |
| JP | 2006-176747 | A | | 7/2006 |
| JP | 2007-112868 | A | | 5/2007 |
| JP | 2007-191620 | A | | 8/2007 |
| JP | 2008-115372 | A | | 5/2008 |
| JP | 2008115372 | A | * | 5/2008 |
| JP | 2008-150492 | A | | 7/2008 |
| JP | 2008-247956 | A | | 10/2008 |
| JP | WO2009/013847 | A1 | | 1/2009 |
| JP | 2009-249532 | A | | 10/2009 |
| WO | WO 2005/097894 | A1 | | 10/2005 |
| WO | WO 2009013847 | A1 | * | 1/2009 | .............. C08L 67/04 |
| WO | WO 2009129499 | A1 | * | 10/2009 | ................. C08J 3/22 |
| WO | WO 2012081532 | A1 | * | 6/2012 | |

OTHER PUBLICATIONS

Ciullo, P.A., Ed., Industrial Minerals and Their Uses: A Handbook and Formulary, Noyes Publications: Westwood, New Jersey, 1996, pp. 448.*
JP 2008-115372 A (2008), machine translation, JPO Advanced Industrial Property Network.*
WO 2009013847 A1 (2009), machine translation, JPO Advanced Industrial Property Network.*
JP 2013-047314 A (2013), machine translation, JPO Advanced Industrial Property Network.*
JP 2007-112868 A (2007), machine translation, JPO Advanced Industrial Property Network (AIPN).*
Yaws, Yaws Critical Property Data for Chemical Engineers and Chemists, Table 2 Physical Properties—Organic Compounds. Norwich, NY, Knovel, 2012.*
International Search Report for International Patent Application No. PCT/JP2011/051307, dated Feb. 22, 2011.

* cited by examiner

*Primary Examiner* — Susannah Chung
*Assistant Examiner* — Josephine Chang
(74) *Attorney, Agent, or Firm* — Birch, Stewart, Kolasch & Birch, LLP

(57) ABSTRACT

A method for producing a polylactic acid resin composition, including the following steps (1) and (2): step (1): subjecting an organic crystal nucleating agent to a wet pulverization in the presence of a carboxylic acid ester having a weight-average molecular weight of from 150 to 600 and a viscosity at 23° C. of from 1 to 500 mPa·s and/or a phosphoric ester having a weight-average molecular weight of from 150 to 600 and a viscosity at 23° C. of from 1 to 500 mPa·s to give a finely pulverized organic crystal nucleating agent composition; and step (2): melt-kneading a raw material for a polylactic acid resin composition comprising the finely pulverized organic crystal nucleating agent composition obtained in the step (1) and a polylactic acid resin.

12 Claims, No Drawings

PROCESS FOR PRODUCTION OF POLYLACTIC ACID RESIN COMPOSITION

TECHNICAL FIELD

The present invention relates to a method for producing a polylactic acid resin composition. More specifically, the present invention relates to a method for producing a polylactic acid resin composition, which can be suitably used as, for example, daily sundries, household electric appliance parts, automobile parts, or the like, and a polylactic acid resin composition obtained by the method.

BACKGROUND ART

A polylactic acid resin is inexpensive because L-lactic acid used as a raw material is produced by a fermentation method using a sugar extracted from maize, potatoes, or the like. Also, the polylactic acid resin has a very low amount of a carbon dioxide discharge because the raw material is plant-derived, and the properties of the resin include strong rigidity and high transparency. Therefore, the utilization of polylactic acid resins is expected to be promising at present.

However, the polylactic acid resin has a slow crystallization velocity, so that if crystallization is carried out, a long time period is required, thereby worsening the productivity. In view of the above, a technique of improving a crystallization rate by blending a crystal nucleating agent or the like in the polylactic acid resin has become known.

For example, in Patent Publication 1, a polylactic acid resin composition having an excellent crystallization velocity is obtained by blending a polylactic acid resin with a phenylphosphonic (acid) derivative having a particular structure.

In Patent Publication 2, a polylactic acid resin composition having an excellent crystallization velocity and heat resistance is obtained by blending a biodegradable resin with a mixture of at least one compound selected from the compounds having a hydroxyl group and an amide group in the molecule and a metal salt of a phenylphosphonic acid.

In Patent Publication 3, a polylactic acid resin composition having an excellent crystallization velocity and heat resistance is obtained by blending a polylactic acid resin with a particular polyester-polyol and a crystal nucleating agent, and a polylactic acid resin composition having even higher heat resistance is obtained by previously mixing the polyester-polyol and the crystal nucleating agent upon melt-kneading, thereby forming the crystal nucleating agent into fine particles.

In addition, Patent Publication 4 discloses a method utilizing an aliphatic phosphoric ester compound having an aliphatic chain having 12 to 28 carbon atoms or the like, as a lubricant during molding of a polylactic acid-based resin composition. Patent Publication 5 discloses that a secondary workability such as stretch workability can be improved in the production of a porous sheet by adding several aliphatic phosphoric triesters as plasticizers together with a crystal nucleating agent.

PRIOR ART PUBLICATIONS

Patent Publications

Patent Publication 1: WO 2005/097894
Patent Publication 2: Japanese Patent Laid-Open No. 2008-115372
Patent Publication 3: WO 2009/013847
Patent Publication 4: Japanese Patent Laid-Open No. 2002-179899 (Japanese Patent Gazette No. 3532850)
Patent Publication 5: Japanese Patent Laid-Open No. 2007-112868

SUMMARY OF THE INVENTION

Problems to be Solved by the Invention

According to the conventional techniques, it is made possible to improve a crystallization velocity and heat resistance of the polylactic acid resin composition. In the recent years, it is expected to use polylactic acid resin compositions in extended applications such as automobile applications, so that polylactic acid resin compositions having even faster crystallization velocities and more excellent heat resistance are earnestly desired. In addition, in order to use the polylactic acid resin compositions as substitutes for conventional petroleum-based resins, the same level of moldability as the polypropylene resin or the like is required, so that molding workability at even lower temperatures are in demand. However, in conventional techniques, the effects are not sufficient and further improvements are in demand.

An object of the present invention is to provide a method for producing a polylactic acid resin composition having a fast crystallization velocity, excellent molding workability at low temperatures, and excellent heat resistance, and a polylactic acid resin composition obtained by the method.

Means to Solve the Problems

In view of the above, as a result of intensive studies in order to solve the above problems, the present inventors have found that in the method for producing a polylactic acid resin composition including blending and melt-kneading a raw material for a polylactic acid resin composition containing a polylactic acid resin and a crystal nucleating agent, an organic crystal nucleating agent composition obtained by subjecting an organic crystal nucleating agent to a wet pulverization in the presence of a carboxylic acid ester having a weight-average molecular weight of from 150 to 600 and a viscosity at 23° C. of from 1 to 500 mP·s, and/or a phosphoric ester having a weight-average molecular weight of from 150 to 600 and a viscosity at 23° C. of from 1 to 500 mPa·s is used as the crystal nucleating agent, whereby the resulting polylactic acid resin composition has an excellent crystallization velocity, molding workability at low temperatures, and heat resistance.

The present invention relates to:
[1] a method for producing a polylactic acid resin composition, including the following steps (1) and (2):
step (1): subjecting an organic crystal nucleating agent to a wet pulverization in the presence of a carboxylic acid ester having a weight-average molecular weight of from 150 to 600 and a viscosity at 23° C. of from 1 to 500 mP·s and/or a phosphoric ester having a weight-average molecular weight of from 150 to 600 and a viscosity at 23° C. of from 1 to 500 mPa·s to give a finely pulverized organic crystal nucleating agent composition; and
step (2): melt-kneading a raw material for a polylactic acid resin composition containing the finely pulverized organic crystal nucleating agent composition obtained in the step (1) and a polylactic acid resin
[2] a polylactic acid resin composition obtainable by the method of the above [1].

Effects of the Invention

The polylactic acid resin composition obtainable by the method of the present invention exhibits some effects of being excellent in a crystallization velocity, molding workability at low temperatures, and heat resistance.

MODES FOR CARRYING OUT THE INVENTION

One of the major features of the method for producing a polylactic acid resin composition of the present invention is in that during melt-kneading of a raw material for a polylactic acid resin composition containing a polylactic acid resin and a crystal nucleating agent, the use of an organic crystal nucleating agent composition obtainable by subjecting an organic crystal nucleating agent to a wet pulverization in the presence of a carboxylic acid ester having a weight-average molecular weight of from 150 to 600 and a viscosity at 23° C. of from 1 to 500 mP·s and/or a phosphoric ester having a weight-average molecular weight of from 150 to 600 and a viscosity at 23° C. of from 1 to 500 mPa·s, as the crystal nucleating agent.

In a polylactic acid resin composition of Patent Publication 3, in order to increase crystallization velocity, molding workability at low temperatures and heat resistance, a polyester-polyol and a crystal nucleating agent are previously mixed upon melt-kneading to form fine crystal nucleating agent particles. As this polyester-polyol, in order to increase compatibility with a polylactic acid resin, which is a kind of a polyester, and wettability with fine particles of an inorganic natural product, such as talc, which is a crystal nucleating agent, those having a large molecular weight and a high viscosity have been used. However, in the present invention, surprisingly, by subjecting an organic crystal nucleating agent to a wet pulverization using a carboxylic acid ester and/or a phosphoric ester each having a small molecular weight and a low viscosity to make fine particles, it is found that the resulting organic crystal nucleating agent composition serves to a more increased crystallization velocity of a polylactic acid resin composition, in other words, crystallization of the polylactic acid resin composition is made possible in an even shorter period of time, so that the polylactic acid resin composition having favorable molding workability at even lower temperatures and excellent heat resistance is obtained. The carboxylic acid ester and the phosphoric ester usable in the present invention has a small molecular weight and a low viscosity, so that it is considered that they serve both as a dispersion medium and a solvent for suppressing re-aggregation of an organic crystal nucleating agent in the wet-pulverization step. For this reason, it is considered that the formation of fine particles of the organic crystal nucleating agent is accomplished, and at the same time the resulting organic crystal nucleating agent composition is finely dispersed in a polylactic acid resin without undergoing re-aggregation in the melt-kneading step, because the ester is deposited to the surface of the organic crystal nucleating agent in the organic crystal agent composition. In view of the above, it is considered that the crystallization cores for accelerating crystallization in the polylactic acid resin composition are increased, thereby improving a crystallization velocity of the polylactic acid resin. Furthermore, since the ester existing on the surface of the organic crystal nucleating agent composition also functions as a plasticizer, it is considered that the finely pulverized organic crystal nucleating agent composition effectively acts thereto, as a result of accelerating plasticization of the polylactic acid resin, and thereby a polylactic acid resin composition having an even more improved crystallization velocity and at the same time having excellent molding workability at low temperatures and excellent heat resistance, is obtained.

<Method for Producing Polylactic Acid Resin Composition>

The method of the present invention includes the steps of: step (1): subjecting an organic crystal nucleating agent to a wet pulverization in the presence of a carboxylic acid ester having a weight-average molecular weight of from 150 to 600 and a viscosity at 23° C. of from 1 to 500 mPa·s and/or a phosphoric ester having a weight-average molecular weight of from 150 to 600 and a viscosity at 23° C. of from 1 to 500 mPa·s to give a finely pulverized organic crystal nucleating agent composition; and step (2): melt-kneading a raw material for a polylactic acid resin composition containing the finely pulverized organic crystal nucleating agent composition obtained in the step (1) and a polylactic acid resin.

[Step (1)]

The step (1) is a step of subjecting an organic crystal nucleating agent to a wet pulverization in the presence of a carboxylic acid ester having a weight-average molecular weight of from 150 to 600 and a viscosity at 23° C. of from 1 to 500 mPa·s and/or a phosphoric ester having a weight-average molecular weight of from 150 to 600 and a viscosity at 23° C. of from 1 to 500 mPa·s to give a finely pulverized organic crystal nucleating agent composition (hereinafter also referred to as "finely pulverized organic crystal nucleating agent"). Here, the above-mentioned carboxylic acid esters and phosphoric esters usable in the wet pulverization of the organic crystal nucleating agent are collectively referred to herein as "pulverization aid esters."

[Organic Crystal Nucleating Agent]

The organic crystal nucleating agent usable in the present invention is always preferably in the form of a solid within the range of from 20° to 200° C., from the viewpoint of improving a crystallization velocity of the polylactic acid resin, and at least one member selected from the group consisting of the following (a) to (c) is more preferred.

(a) at least one organic compound selected from the group consisting of compounds having an isoindolinone backbone, compounds having a diketo-pyrrolo-pyrrole backbone, compounds having a benzimidazolone backbone, compounds having an indigo backbone, compounds having a phthalocyanine backbone, and compounds having a porphyrin backbone [referred to as organic crystal nucleating agent (a)];

(b) at least one organic compound selected from the group consisting of carbohydrazides, melamine compounds, uracils, and N-substituted ureas [referred to as organic crystal nucleating agent (b)];

(c) at least one organic compound selected from the group consisting of metal salts of dialkyl aromatic sulfonates, metal salts of phosphoric esters, metal salts of phenylphosphonic acids, metal salts of rosin acids, aromatic carboxylic acid amides, and rosin acid amides [referred to as organic crystal nucleating agent (c)].

Organic Crystal Nucleating Agent (a)

The organic crystal nucleating agent (a) includes at least one organic compound selected from the group consisting of compounds having an isoindolinone backbone, compounds having a diketo-pyrrolo-pyrrole backbone, compounds having a benzimidazolone backbone, compounds having an indigo backbone, compounds having a phthalocyanine backbone, and compounds having a porphyrin backbone.

The compounds having an isoindolinone backbone include compounds having an isoindolinone backbone and substituted compounds thereof, and specific examples include yellow pigments PY109, PY110, PY173, and an orange pigment PO61.

The compounds having a diketo-pyrrolo-pyrrole backbone include compounds having a diketo-pyrrolo-pyrrole backbone and substituted compounds thereof, and specific examples include red pigments PR254, PR255, PR264, PR270, PR272, and orange pigments PO71, PO73.

The compounds having a benzimidazolone backbone include compounds having a benzimidazolone backbone and substituted compounds thereof, and specific examples include a purple pigment PV32, red pigments PR171, PR175, PR176, PR185, PR208, yellow pigments PY120, PY151, PY154, PY156, PY175, PY180, PY181, PY194, and orange pigments PO36, PO60, PO62, PO72.

The compounds having an indigo backbone include compounds having an indigo backbone and substituted compounds thereof, and specific examples include a blue dye Vat Blue 1, blue pigments PB66, PB63, red pigments PR88, PR181, brown pigment PBr27, and indigo carmine.

The compounds having a phthalocyanine backbone include compounds having a phthalocyanine backbone and substituted compounds thereof, and specific examples include phthalocyanine, blue pigments PB15, PB15:2, PB15:3, PB15:4, PB15:5, PB15:6, PB16, green pigments PG7, PG36, copper phthalocyanine, zinc phthalocyanine, titanyl phthalocyanine, aluminum phthalocyanine, vanadium phthalocyanine, cadmium phthalocyanine, antimony phthalocyanine, chromium phthalocyanine, germanium phthalocyanine, iron phthalocyanine, chloroaluminum phthalocyanine, chloroindium phthalocyanine, chlorogallium phthalocyanine, magnesium phthalocyanine, dialkyl phthalocyanine, tetramethyl phthalocyanine, tetraphenyl phthalocyanine, uranium complexes having five isoindole rings (Superphthalocyanine), and boron complexes consisting of three isoindole rings. In addition, the substituted compounds include those substituted by the following substituents, including halides, alkylated compounds, and the like. The substituents include halogen atoms such as chlorine, bromine, fluorine, and iodine, alkyl groups such as a methyl group, an ethyl group, and a propyl group, alkoxy groups such as a methoxy group and an ethoxy group, a hydroxyl group, an amino group, and the like.

The compounds having a porphyrin backbone include compounds having a porphyrin backbone and substituted compounds thereof, and specific examples include chlorophyll compounds, hemin compounds, and esters thereof. Also, substituted compounds include those substituted by the following substituents, including alkyl groups such as methyl, ethyl, n-propyl, isopropyl, n-butyl, isobutyl, sec-butyl, tert-butyl, n-pentyl, isoamyl, tert-amyl, n-hexyl, isohexyl, n-heptyl, n-octyl, n-nonyl, n-decyl, n-undecyl, n-dodecyl, n-tridecyl, n-tetradecyl, n-pentadecyl, n-hexadecyl, n-heptadecyl, n-octadecyl, n-eicosyl, n-docosyl, and n-tetracosyl; alkenyl groups such as vinyl, propenyl (1-, 2-), butenyl (1-, 2-, 3-), pentenyl, octenyl, and butadienyl (1-, 3-); alkynyl groups such as ethynyl, propynyl (1-, 2-), butynyl (1-, 2-, 3-) pentynyl, octynyl, and decynyl; cycloalkyl groups such as cyclopropyl, cyclobutyl, cyclopentyl, cyclohexyl, cycloheptyl, and cyclooctyl; aryl groups having single ring- or condensed multi-rings such as phenyl, biphenyl, naphthyl, anthryl, phenanthryl, acenaphthylenyl; those substituted with a cross-linked cyclic hydrocarbon group such as 1-adamantyl, 2-adamantyl, 2-norbornanyl, 5-norbornen-2-yl. In addition, the substituents may be halides or sulfonates.

Organic Crystal Nucleating Agent (b)

The organic crystal nucleating agent (b) includes at least one organic compound selected from the group consisting of carbohydrazides, melamine compounds, uracils, and N-substituted ureas.

The carbohydrazides include ethylenedicarbonyldibenzoyl hydrazide, tetramethylenedicarbonyldibenzoyl hydrazide, hexamethylenedicarbonyldibenzoyl hydrazide, octamethylenedicarbonyldibenzoyl hydrazide, decamethylenedicarbonyldibenzoyl hydrazide, dodecamethylenedicarbonyldibenzoyl hydrazide, cyclohexylenedicarbonyldibenzoyl hydrazide, octamethylenedicarbonyldi(4-methylbenzoyl)hydrazide, octamethylenedicarbonyldi(4-t-butylbenzoyl)hydrazide, octamethylenedicarbonyldi(2-methylbenzoyl)hydrazide, and octamethylenedicarbonyldi(3-methylbenzoyl)hydrazide.

The melamine compounds include melamine, substituted melamine compounds, deammoniation condensates of melamine, salts of melamines and acids.

The substituted melamine compounds include compounds in which a hydrogen of an amino group of melamine is substituted, and the substituent includes an alkyl group, an alkenyl group, a phenyl group, a hydroxyalkyl group, a hydroxyalkyl(oxa-alkyl) group, an aminoalkyl group, and the like.

The deammoniation condensates of melamine include melam, melem, melon, metton, and the like.

The salts of melamines and acids include salts of at least one melamine selected from melamine, substituted melamine compounds, and deammoniation condensates of melamine and acids. The acids include organic acids such as isocyanuric acid, formic acid, acetic acid, oxalic acid, malonic acid, lactic acid, citric acid, benzoic acid, isophthalic acid, and terephthalic acid; and inorganic acids such as hydrochloric acid, nitric acid, sulfuric acid, pyrosulfuric acid, methanesulfonic acid, ethanesulfonic acid, paratoluenesulfonic acid, dodecylbenzenesulfonic acid, salts of sulfamic acid, salts of phosphoric acid, salts of pyrophosphoric acid, salts of polyphosphoric acid, salts of phosphonic acid, salts of phenylphosphonic acid, salts of alkylphosphonic acid, salts of phosphinic acid, salts of boric acid, and salts of tungstic acid.

The uracils include uracil, 6-methyluracil, 5-methyluracil (thymine), 6-azathymine, 6-azauracil, 5-chlorouracil, 6-benzyl-2-thiouracil, 5-cyanouracil, ethyl 2-thiouracil-5-carboxylate, 5-ethyluracil, 5,6-dihydro-6-methyluracil, 5-(hydroxymethyl)uracil, 5-iodouracil, 5-methyl-2-thiouracil, 5-nitrouracil, 5-(trifluoromethyl)uracil, 2-thiouracil, 5-fluorouracil, and the like.

The N-substituted ureas include xylenebis laurylurea, xylenebis myristylurea, xylenebis palmitylurea, xylenebis stearylurea, and the like.

Organic Crystal Nucleating Agent (c)

The organic crystal nucleating agent (c) includes at least one organic compound selected from the group consisting of metal salts of dialkyl aromatic sulfonates, metal salts of phosphoric esters, metal salts of phenylphosphonic acids, metal salts of rosin acids, aromatic carboxylic acid amides, and rosin acid amides.

The metal salts of dialkyl aromatic sulfonates include barium di(dimethyl 5-sulfoisophthalate), calcium di(dimethyl 5-sulfoisophthalate), potassium dimethyl 5-sulfoisophthalate, and the like.

The metal salts of phosphoric esters include sodium-2,2'-methylenebis(4,6-di-t-butylphenyl)phosphate, aluminumbis(2,2'-methylenebis-4,6-di-t-butylphenyl phosphate), and the like.

The metal salts of phenylphosphonic acids include metal salts of phenylphosphonic acid having a phenyl group and a phosphonic group ($-PO(OH)_2$), each of which may have a substituent, and the substituent of the phenyl group includes alkyl groups having 1 to 10 carbon atoms, and alkoxycarbonyl groups of which alkoxy moiety has 1 to 10 carbon atoms, and the like. Specific examples of the phenylphosphonic acids include unsubstituted phenylphosphonic acid, methylphenylphosphonic acid, ethylphenylphosphonic acid, propylphenylphosphonic acid, butylphenylphosphonic acid, dimethoxycarbonylphenylphosphonic acid, diethoxycarbonylphenylphosphonic acid, and the like, and the unsubstituted phenylphosphonic acid is preferred.

The metal salts of the phenylphosphonic acid include salts of lithium, sodium, magnesium, aluminum, potassium, calcium, barium, copper, zinc, iron, cobalt, nickel, or the like, and the zinc salt is preferred.

The metal salts of the rosin acids include metal salts of pimaric acid, sandaracopimaric acid, palustric acid, isopimaric acid, abietic acid, dehydroabietic acid, methyldehydroabietic acid, neoabietic acid, dihydropimaric acid, dihydroabietic acid, tetrahydroabietic acid, and the like.

The aromatic carboxylic acid amides include 1,3,5-benzenetricarboxylic acid tris(t-butylamide) (trimesic acid tris(t-butylamide)), m-xylylenebis 12-hydroxystearic amide, 1,3, 5-benzenetricarboxylic acid tricyclohexylamide(trimesic acid tricyclohexylamide), trimesic acid tri(2-methylcyclohexylamide), 2,6-naphthalenedicarboxylic acid dicyclohexylamide, and the like.

The rosin acid amides include p-xylylenebis rosin acid amide, p-phenylenediamine monorosin acid amide, and the like.

These organic crystal nucleating agents may be used alone or in a combination of two or more kinds. For example, the organic crystal nucleating agents (a) themselves, the organic crystal nucleating agents (b) themselves, the organic crystal nucleating agents (c) themselves, the organic crystal nucleating agent (a) and the organic crystal nucleating agent (b), the organic crystal nucleating agent (a) and the organic crystal nucleating agent (c), the organic crystal nucleating agent (b) and the organic crystal nucleating agent (c), or the organic crystal nucleating agent (a), the organic crystal nucleating agent (b), and the organic crystal nucleating agent (c) can be used in combination. Among them, the metal salts of phenylphosphonic acid, PY109, PB15:3, PB15, and PB15:6 are preferred, and the metal salts of phenylphosphonic acid are more preferred, from the viewpoint of improving a crystallization velocity, and efficiently obtaining a molded article having excellent heat resistance.

The shape and the average particle size of the organic crystal nucleating agent subjected to the wet pulverization are not particularly limited, so long as the organic crystal nucleating agent can be subjected to the wet pulverization. The organic crystal nucleating agent has a volume-median particle size ($D_{50}$) of preferably from 500 nm to 5 μm, more preferably from 600 nm to 2 μm, and even more preferably from 700 nm to 1.5 μm, from the viewpoint of increasing efficiency of the wet pulverization, thereby improving the fine pulverization of the organic crystal nucleating agent composition obtained. Here, the average particle size of the organic crystal nucleating agent as used herein means a volume-median particle size ($D_{50}$), which can be measured in accordance with the method described in Examples set forth below.

[Pulverization Aid Ester]

In the present invention, in the wet pulverization of the above-mentioned organic crystal nucleating agent, a carboxylic acid ester having a weight-average molecular weight of from 150 to 600 and a viscosity at 23° C. of from 1 to 500 mPa·s, and/or a phosphoric ester having a weight-average molecular weight of from 150 to 600 and a viscosity at 23° C. of from 1 to 500 mPa·s is used. Here, in the present invention, the phosphoric ester usable in the wet pulverization has a viscosity at 23° C. of from 1 to 500 mPa·s, while the phosphoric ester, which is the organic crystal nucleating agent, subjected to the pulverization is a solid at a temperature range of from 20° to 200° C., it is evident that the phosphoric esters are different substances.

The carboxylic acid ester and/or the phosphoric ester usable in the wet pulverization of the organic crystal nucleating agent in the present invention is a carboxylic acid ester having a weight-average molecular weight of from 150 to 600 and a viscosity of from 1 to 500 mPa·s, and/or a phosphoric ester having a weight-average molecular weight of from 150 to 600 and a viscosity of from 1 to 500 mPa·s, which serves as both a solvent and a dispersant upon the fine pulverization of the organic crystal nucleating agent. By subjecting the organic crystal nucleating agent to the wet pulverization in the presence of the carboxylic acid ester and/or the phosphoric ester as described above, the aggregation of the organic crystal nucleating agent during the pulverization step is suppressed, thereby making it possible to be finely pulverized. Further, a crystallization velocity, molding workability at low temperatures, and heat resistance of a polylactic acid resin composition obtained from this finely pulverized organic crystal nucleating agent composition are also improved. The reasons therefor are considered to be as follows. The finely pulverized organic crystal nucleating agent composition in the present invention has a small particle size, and the carboxylic acid ester and/or the phosphoric ester each having a specified molecular weight and a specified viscosity exists on its surface, so that the finely pulverized organic crystal nucleating agent composition is finely dispersed in the polylactic acid resin composition without being re-aggregated, whereby consequently the polylactic acid resin composition has an increased number of crystal nuclei to a large number. The ester acts as a plasticizer to accelerate the plasticization of the polylactic acid resin, whereby consequently the finely pulverized organic crystal nucleating agent composition effectively act, so that a polylactic acid resin composition having an even more improved crystallization velocity, and at the same having excellent molding workability at low temperatures and heat resistance is obtained.

(Carboxylic Acid Ester Having Weight-Average Molecular Weight of from 150 to 600 and Viscosity at 23° C. of from 1 to 500 mPa·s)

The above-mentioned carboxylic acid ester has a weight-average molecular weight of from 150 to 600. When the carboxylic acid ester has a weight-average molecular weight of 600 or less, its volume is large, so that the fine pulverization of the organic crystal nucleating agent would not be insufficient. On the other hand, when the molecular weight is 150 or more, the plasticizing effect to the polylactic acid resin acts, so that a polylactic acid resin composition having a sufficient crystallization velocity can be obtained. The above-mentioned carboxylic acid ester has a weight-average molecular weight of preferably from 250 to 600, more preferably from 300 to 600, even more preferably from 350 to 550, and even more preferably from 400 to 500, from the viewpoint of finely pulverizing the organic crystal nucleating agent, and from the viewpoint of a plasticizing effect to the polylactic acid resin. Here, in the present specification, the weight-average molecular weights of the esters usable in the wet pulverization of the organic crystal nucleating agent can be measured in accordance with the method described in Examples set forth below.

The above-mentioned carboxylic acid ester has a viscosity at 23° C. of from 1 to 500 mPa·s. When the carboxylic acid ester has a viscosity of 500 mPa·s or less, there are no risk that the viscosity is too high so that it is made difficult to finely pulverize the organic crystal nucleating agent. On the other hand, when the carboxylic acid ester has a viscosity of 1 mPa·s or more, a plasticizing effect to the polylactic acid resin is favorable, so that a polylactic acid resin composition having a sufficient crystallization velocity can be obtained. The above-mentioned carboxylic acid ester has a viscosity at 23° C. of preferably from 1 to 400 mPa·s, more preferably from 2 to 200 mPa·s, even more preferably from 3 to 100 mPa·s, even more preferably from 3 to 50 mPa·s, from the viewpoint of finely pulverizing the organic crystal nucleating agent, and from the viewpoint of a plasticizing effect to the polylactic acid resin. Here, in the present specification, the viscosity of the ester usable in the wet pulverization of the organic crystal nucleating agent can be measured in accordance with the method described in Examples set forth below.

The carboxylic acid ester having a weight-average molecular weight of from 150 to 600 and a viscosity at 23° C. of from 1 to 500 mP·s is obtained by polycondensation of an alcohol component and a carboxylic acid component given below.

As the alcohol component, a mono-alcohol, a polyhydric alcohol or the like can be contained, and it is desired to contain a mono-alcohol having preferably from 3 to 18 carbon atoms, more preferably from 3 to 16 carbon atoms, and even more preferably from 3 to 14 carbon atoms, from the viewpoint of fine pulverization of the organic crystal nucleating agent and compatibility with the polylactic acid resin, plasticity of the polylactic acid resin, volatile resistance of the above-mentioned carboxylic acid ester. In addition, from the same viewpoint, it is preferable to contain an alkylene oxide adduct of an alcohol with addition of an alkyleneoxy group having 2 or 3 carbon atoms in an amount of preferably from 0.5 to 5 mol, more preferably from 1.0 to 4 mol, and even more preferably from 2 to 3 mol, in an average number of moles added, per one hydroxyl group of the alcohol (hereinafter also referred to as alkylene oxide adduct of an alcohol). When the average number of moles added of the alkyleneoxy group having from 2 to 3 carbon atoms is 0.5 mol or more, sufficient plasticity can be given to the polylactic acid resin, and when the average number of moles added is 5 mol or less, bleeding resistance of the above-mentioned carboxylic acid ester becomes favorable. The alkyleneoxy group having 2 or 3 carbon atoms is preferably an ethyleneoxy group, from the viewpoint of plasticization efficiency to the polylactic acid resin.

In addition, the functional group bound to the ester group other than the alkyleneoxy group, in a case of a mono-alcohol, is desirably a hydrocarbon group having preferably from 1 to 8 carbon atoms, more preferably from 1 to 6 carbon atoms, even more preferably from 1 to 4 carbon atoms, and even more preferably from 1 to 2 carbon atoms, from the viewpoint of compatibility with the polylactic acid resin. In a case of a polyhydric alcohol, the functional group is desirably a hydrocarbon group having preferably from 1 to 8 carbon atoms, more preferably from 1 to 6 carbon atoms, and even more preferably from 1 to 4 carbon atoms, from the viewpoint of compatibility with the polylactic acid resin.

Here, the alcohol constituting the above-mentioned ester group may be used alone or in two or more kinds. It is preferable that the alcohol component contains an alkylene oxide adduct of the alcohol mentioned above, it is more preferable that all the alcohols are alkylene oxide adducts of the alcohol mentioned above, and it is even more preferable that all the alcohols are alkylene oxide adducts of the identical alcohol mentioned above.

In addition, the alcohol component may contain an aromatic alcohol from the viewpoint of volatile resistance of the above-mentioned carboxylic acid ester. Since the aromatic alcohol has excellent compatibility to the polylactic acid resin as compared to the aliphatic alcohol having the same number of carbon atoms, the weight-average molecular weight can be increased while keeping bleeding resistance. The aromatic alcohol includes benzyl alcohol and the like, and of the two or more ester groups contained in the ester compound, it is desired that the aromatic alcohol is constituted by, out of the two or more ester groups contained in the ester compound, ester groups preferably that exceeds 0 and is equal to or less than 1.5, more preferably that exceeds 0 and is equal to or less than 1.2, and even more preferably that exceeds 0 and is equal to or less than 1.0.

A carboxylic acid compound contained in the carboxylic acid component includes known carboxylic acids, anhydrides thereof, and alkyl (1 to 3 carbon atoms) esters of the acids, and the like. The carboxylic acid compound is preferably carboxylic acids having 1 to 6 carbon atoms, and more preferably carboxylic acids having 2 to 5 carbon atoms, from the viewpoint of fine pulverization of the organic crystal nucleating agent, compatibility with the polylactic acid resin, plasticization, and volatile resistance of the carboxylic acid ester. Specifically, monocarboxylic acids having 1 to 6 carbon atoms include acetic acid, propanoic acid, butanoic acid, pentanoic acid, and hexanoic acid; and dicarboxylic acids having 2 to 6 carbon atoms include oxalic acid, malonic acid, succinic acid, glutaric acid, and adipic acid. Among them, the dicarboxylic acids having 2 to 6 carbon atoms are preferred, oxalic acid, malonic acid, succinic acid, glutaric acid, and adipic acid are more preferred, and succinic acid, glutaric acid, and adipic acid are even more preferred, from the viewpoint of compatibility of the ester obtained with the organic crystal nucleating agent and the polylactic acid resin, plasticization, and volatile resistance of the carboxylic acid ester. Here, carboxylic acids, anhydrides thereof, an alkyl esters of the acids are collectively referred to herein as carboxylic acid compounds.

The polycondensation of the alcohol component and the carboxylic acid component can be carried out in accordance with a known method. For example, in a case where the carboxylic acid ester usable in the present invention is a polycarboxylic acid ether ester, the carboxylic acid ester is obtained by directly reacting a saturated dibasic acid having 3 to 5 carbon atoms or an anhydride thereof and a polyalkylene glycol monoalkyl ether, or carrying out transesterification between a lower alkyl ester of a saturated dibasic acid having 3 to 5 carbon atoms and a polyalkylene glycol monoalkyl ether, in the presence of an acid catalyst such as paratoluenesulfonic acid monohydrate or sulfuric acid, or a metal catalyst such as dibutyltin oxide. Specifically, for example, the carboxylic acid ester can be obtained by charging a reaction vessel with a polyethylene glycol monoalkyl ether, a saturated dibasic acid, and paratoluenesulfonic acid monohydrate as a catalyst so as to have a proportion of polyethylene glycol monoalkyl ether/saturated dibasic acid/paratoluenesulfonic acid monohydrate (molar ratio) of 2-4/1/0.001-0.05, and subjecting the mixture to dehydration at a temperature of from 100° to 130° C. under normal pressure or a reduced pressure, in the presence or absence of a solvent such as toluene. A method of carrying out the reaction under a reduced pressure without using a solvent is preferred.

In addition, in a case where the carboxylic acid ester usable in the present invention is a polyhydric alcohol ester, for example, an alkylene oxide having from 2 to 3 carbon atoms is added to glycerol using an autoclave at a temperature of from 120° to 160° C. in an amount of from 3 to 9 mol per one mol of glycerol, in the presence of an alkali metal catalyst. Based on one mol of the alkylene oxide adduct of glycerol obtained is added dropwise 3 mol of acetic acid anhydride at 110° C., and after the termination of the dropwise addition, the mixture is aged at 110° C. for 2 hours to carry out acetylation. The reaction product is subjected to steam distillation under a reduced pressure to distill away acetic acid and unreacted acetic acid anhydride contained, whereby a carboxylic acid ester can be obtained.

In addition, in a case where the carboxylic acid ester usable in the present invention is a hydroxycarboxylic acid ether ester, an alkylene oxide having from 2 to 3 carbon atoms is added to a hydroxycarboxylic acid such as lactic acid in an amount of from 2 to 5 mol per one mol of the hydroxycarboxylic acid using an autoclave at a temperature of from 120° to 160° C., in the presence of an alkali metal catalyst. Based on one mol of the alkylene oxide adduct of lactic acid obtained was added dropwise 1 mol of acetic acid anhydride at 110° C., and after the termination of the dropwise addition, the mixture is aged at 110° C. for 2 hours to carry out acetylation. The reaction product is subjected to steam distillation under a reduced pressure to distill away acetic acid and unreacted acetic acid anhydride contained. Next, a reaction vessel is charged with materials so as to have a proportion of reaction product obtained/polyalkylene glycol monoalkyl ether/paratoluenesulfonic acid monohydrate (catalyst) (molar ratio) of 1/1-2/0.001-0.05, and subjecting the mixture to dehydration at a temperature of from 100° to 130° C. under normal pressure or a reduced pressure, in the presence or absence of a solvent such as toluene, whereby a hydroxycarboxylic acid ether ester can be obtained.

Thus, the carboxylic acid ester usable in the step (1) is obtained, and in the present invention, at least one member selected from the group consisting of carboxylic acid esters formed between succinic acid or adipic acid and a polyethylene glycol monomethyl ether, and carboxylic acid esters formed between acetic acid and ethylene oxide adduct of ethylene glycol is preferred, and the carboxylic acid esters formed between succinic acid or adipic acid and a polyethylene glycol monomethyl ether are more preferred, from the viewpoint of fine pulverization of the organic crystal nucleating agent, satisfaction of both strength and flexibility of the polylactic acid resin composition, moldability, plasticization, and bleeding resistance of the carboxylic acid ester.

In addition, more preferable are alkyl ether esters of polyhydric alcohols, such as carboxylic acid esters formed between acetic acid and an ethylene oxide adduct of glycerol, an ethylene oxide moiety of which is added in an amount of from 3 to 9 mol in average (1 to 3 mol per one hydroxyl group), carboxylic acid esters formed between acetic acid and a propylene oxide adduct of diglycerol, a propylene oxide moiety of which is added in an amount of from 4 to 12 mol in average (1 to 3 mol per one hydroxyl group), and carboxylic acid esters formed between acetic acid and an ethylene oxide adduct of a polyethylene glycol, an ethylene oxide moiety of which is added in an amount of from 4 to 9 mol in average (1 to 3 mol per one hydroxyl group); and carboxylic acid esters formed between polycarboxylic acids and a polyethylene glycol monomethyl ether, such as carboxylic acid esters formed between succinic acid and an ethylene oxide adduct of a polyethylene glycol monomethyl ether, an ethylene oxide moiety of which is added in an amount of from 2 to 4 mol in average, carboxylic acid esters formed between adipic acid and an ethylene oxide adduct of a polyethylene glycol monomethyl ether, an ethylene oxide moiety of which is added in an amount of from 2 to 3 mol in average, and carboxylic acid esters formed between 1,3,6-hexanetricarboxylic acid and an ethylene oxide adduct of a polyethylene glycol monomethyl ether, an ethylene oxide moiety of which is added in an amount of from 2 to 3 mol in average, from the viewpoint of finely pulverizing the organic crystal nucleating agent, satisfying both strength and flexibility of a molding article made of a polylactic acid resin composition, and giving excellent moldability and impact resistance to the polylactic acid resin composition.

Even more preferable are carboxylic acid esters formed between acetic acid and an ethylene oxide adduct of glycerol, an ethylene oxide moiety of which is added in an amount of from 3 to 6 mol in average (1 to 2 mol per one hydroxyl group), carboxylic acid esters formed between acetic acid and an ethylene oxide adduct of a polyethylene glycol, an ethylene oxide moiety of which is added in an amount of from 4 to 6 mol in average, carboxylic acid esters formed between succinic acid and an ethylene oxide adduct of a polyethylene glycol monomethyl ether, an ethylene oxide moiety of which is added in an amount of from 2 to 3 mol in average, carboxylic acid esters formed between adipic acid and diethylene glycol monomethyl ether, and carboxylic acid esters formed between 1,3,6-hexanetricarboxylic acid and diethylene glycol monomethyl ether, from the viewpoint of finely pulverizing the organic crystal nucleating agent, satisfying both strength and flexibility of a molding article made of a polylactic acid resin composition, and giving excellent moldability, impact resistance, and bleeding resistance of the carboxylic acid ester. Even more preferable are carboxylic acid esters formed between succinic acid and triethylene glycol monomethyl ether, from the viewpoint of satisfying both strength and flexibility of a molding article made of a polylactic acid resin composition, and giving excellent moldability, impact resistance, and bleeding resistance, volatile resistance, and irritating odor resistance of the carboxylic acid ester.

In addition, a carboxylic acid ester formed between adipic acid and a diethylene glycol monomethyl ether/benzyl alcohol mixture (weight ratio: 1/1) is preferred, from the viewpoint of volatile resistance.

(Phosphoric Ester Having Weight-Average Molecular Weight of from 150 to 600 and Viscosity at 23° C. of from 1 to 500 mPa·s)

The above-mentioned phosphoric ester has a weight-average molecular weight of from 150 to 600. When the weight-average molecular weight is 600 or less, its volume is large, so that the fine pulverization of the organic crystal nucleating agent would not be insufficient. On the other hand, when the phosphoric ester has a weight-average molecular weight of 150 or more, the plasticizing effect to the polylactic acid resin acts, so that a polylactic acid resin composition having a sufficient crystallization velocity can be obtained. The above-mentioned phosphoric ester has a weight-average molecular weight of preferably from 250 to 600, more preferably from 300 to 600, even more preferably from 350 to 550, and even more preferably from 400 to 500, from the viewpoint of finely pulverizing the organic crystal nucleating agent, and from the viewpoint of a plasticizing effect to the polylactic acid resin.

The above-mentioned phosphoric ester has a viscosity at 23° C. of from 1 to 500 mPa·s. When the phosphoric ester has a viscosity of 500 mP·s or less, there are no risk that the viscosity is too high so that it is made difficult to finely pulverize the organic crystal nucleating agent. On the other hand, when the phosphoric ester has a viscosity of 1 mP·s or more, a plasticizing effect to the polylactic acid resin is favorable, so that a polylactic acid resin composition having a sufficient crystallization velocity can be obtained. The above-mentioned phosphoric ester has a viscosity at 23° C. of preferably from 1 to 400 mPa·s, more preferably from 2 to 200 mPa·s, even more preferably from 3 to 100 mPa·s, even more preferably from 3 to 50 mPa·s, from the viewpoint of finely pulverizing the organic crystal nucleating agent, and from the viewpoint of a plasticizing effect to the polylactic acid resin.

The phosphoric ester having a weight-average molecular weight of from 150 to 600 and a viscosity at 23° C. of from 1 to 500 mPa·s is obtained by polycondensation of an alcohol component and a phosphoric acid component given below.

The alcohol component is exemplified by the alcohol component usable in the preparation of the above-mentioned carboxylic acid ester.

A phosphoric acid compound contained in the phosphoric acid component includes known phosphoric acids, anhydrides thereof, phosphorus oxyhalides, and alkyl(1 to 3 carbon atoms) esters of the acids, and the like, and the phosphorus oxyhalides are preferred, from the viewpoint of fine pulverization of the organic crystal nucleating agent, compatibility with the polylactic acid resin, plasticization, and volatile resistance of the phosphoric ester. Specific examples thereof include phosphorus oxychloride, phosphorus oxybromide, and phosphorus oxyfluoride. Among them, phosphorus oxychloride is preferred, from the viewpoint of compatibility between the ester obtained and the organic crystal nucleating agent and the polylactic acid resin, plasticization, and volatile resistance of the phosphoric ester. Here, phosphoric acid, anhydrides thereof, phosphorus oxyhalides, and alkyl esters of the acids are collectively referred to herein as phosphoric acid compounds.

The polycondensation of the alcohol component and the phosphoric acid component can be carried out in accordance with a known method.

Thus, the phosphoric ester usable in the step (1) is obtained, and in the present invention, a phosphoric triester is preferred, from the viewpoint of increasing chemical stability with the polylactic acid resin during kneading.

It is preferable that the phosphoric triester is a compound represented by the formula (I):

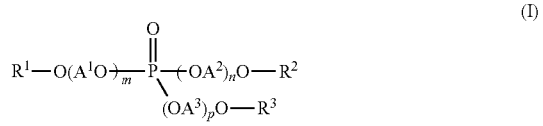

(I)

wherein each of $R^1$, $R^2$, and $R^3$ is independently an alkyl group having from 1 to 4 carbon atoms; each of $A^1$, $A^2$, and $A^3$ is independently an alkylene group having 2 or 3 carbon atoms; and each of m, n, and p is independently a positive number showing the number of average moles of oxyalkylene groups added, wherein m+n+p satisfies the number that exceeds 3 and is equal to or less than 12, from the viewpoint of improving plasticization of the polylactic acid resin and compatibility with the polylactic acid resin.

The compound represented by the formula (I) is a polyether-form phosphoric triester, which may have a symmetric structure or an asymmetric structure, and the phosphoric triester having a symmetric structure is preferred, from the viewpoint of simplicity in the production.

Each of $R^1$, $R^2$, and $R^3$ is independently an alkyl group having from 1 to 4 carbon atoms, which may be linear or branched. Specific examples include a methyl group, an ethyl group, a propyl group, an isopropyl group, a butyl group, and an isobutyl group, and an ethyl group, a propyl group, and a butyl group are preferred.

Each of $A^1$, $A^2$, and $A^3$ is independently an alkylene group having 2 or 3 carbon atoms, which may be linear or branched. Specific examples include an ethylene group, an n-propylene group, and an isopropylene group. Also, $A^1$, $A^2$, and $A^3$ form oxyalkylene groups (alkylene oxides) with an adjoining oxygen atom to form a repeating structure in the compound represented by the formula (I).

Each of m, n, and p is independently a positive number showing the number of average moles of oxyalkylene groups added, wherein m+n+p satisfies the number that exceeds 3 and is equal to or less than 12. Among them, it is preferable that m, n, and p are positive numbers, wherein m+n+p satisfies the number that exceeds 3 and is less than 12, and it is more preferable that m+n+p satisfies the number that exceeds 4 and is less than 12, from the viewpoint of improving plasticization of the polylactic acid resin and compatibility with the polylactic acid resin.

Specific examples of the compound represented by the formula (I) include symmetric polyether-form phosphoric triesters such as tris(ethoxyethoxyethyl)phosphate represented by the formula (II):

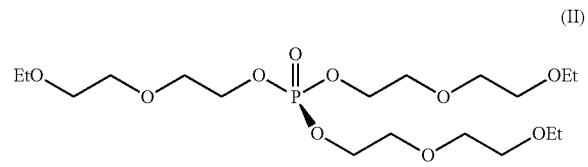

(II)

wherein in the formula (I) all of $R^1$, $R^2$, and $R^3$ are ethyl groups, all of $A^1$, $A^2$, and $A^3$ are ethylene groups, all of m, n, and p are 2, and m+n+p=6, tris(methoxyethoxyethyl)phosphate (m+n+p=6), tris(propoxyethoxyethyl)phosphate (m+n+p=6), tris(butoxyethoxyethyl)phosphate (m+n+p=6), tris(methoxyethoxyethoxyethyl)phosphate (m+n+p=9), and tris(ethoxyethoxyethoxyethyl)phosphate; and asymmetric polyether-form phosphoric triesters such as bis(ethoxyethoxyethyl)methoxyethoxyethoxyethyl phosphate (m+n+p=7) and bis(methoxyethoxyethyl)ethoxyethoxyethyl phosphate (m+n+p=8), or an asymmetric polyether-form phosphoric ester obtained by triester-phosphorylating a mixture of a polyoxyethylene adduct or polyoxypropylene adduct of an alcohol having 1 to 4 carbon atoms so as to satisfy the formula (I). Among them, tris(ethoxyethoxyethyl)phosphate for which sufficient safety is already confirmed is preferred.

The compound represented by the formula (I) may be a commercially available product, or a compound synthesized by a known production method, for example, a method described in Japanese Patent Laid-Open No. Hei-10-17581 may be used.

Here, it is preferable that the carboxylic acid ester and the phosphoric ester mentioned above are complete ester compounds which are entirely esterified, from the viewpoint of finely pulverizing the organic crystal nucleating agent, and from the viewpoint of sufficiently exhibiting the function as a plasticizer.

In addition, the carboxylic acid ester and the phosphoric ester mentioned above can be used alone or in a combination of two or more kinds. When plural number of each of the carboxylic acid ester and the phosphoric ester are used, it is preferable that each the weight-average molecular weight and the viscosity at 23° C. is such that a weighted average thereof is within the range mentioned above.

The weight ratio of the organic crystal nucleating agent to the carboxylic acid ester and/or the phosphoric ester mentioned above (the pulverization aid ester) in the step (1), i.e. organic crystal nucleating agent/pulverization aid ester, is preferably from 1/99 to 50/50, more preferably from 2/98 to 40/60, and even more preferably from 4/96 to 30/70, from the viewpoint of fine pulverization of the organic crystal nucleating agent and from the viewpoint of compatibility with the polylactic acid resin, plasticization, and volatile resistance of the pulverization aid ester. Here, the weight of the pulverization aid ester as referred to herein means a total weight of the carboxylic acid ester and the phosphoric ester used in the wet pulverization in the step (1), and the weight ratio of the organic crystal nucleating agent to the carboxylic acid ester and/or the phosphoric ester mentioned above is expressed as a ratio of the weight of the organic crystal nucleating agent and a total weight of the carboxylic acid ester and the phosphoric ester mentioned above.

In addition, in the present invention, besides the carboxylic acid ester and/or the phosphoric ester mentioned above, other esters and the like can be used together in the fine pulverization of the organic crystal nucleating agent, within the range that would not impair the effects of the present invention.

As pulverizers usable in the wet pulverization in the step (1), known pulverizers such as media pulverizers and non-media pulverizers can be used, and the media pulverizers are preferred, from the viewpoint of pulverization efficiency. The non-media pulverizers include high-pressure pulverizers such as jet mills. The media pulverizers are classified into vessel driving pulverizers and media agitating pulverizers. The vessel driving pulverizers include tumbling mills, vibrating mills, planetary mills, centrifugal fluidized bed mills, and the like. Among them, the vibrating mills are preferred, from the viewpoint of high pulverization efficiency and productivity. The media agitating pulverizers include tower pulverizers such as Tower mills, agitation tank-containing pulverizers such as Attritor, Aquamizer, and Sand Grinder, flow tank-containing pulverizers such as Visco mill and Pearl mill, flow tube-containing pulverizers, and annular pulverizers such as Co-ball-mill; and continuous dynamic pulverizers. Among them, the agitation tank-containing pulverizers are preferred, from the viewpoint of high pulverization efficiency and productivity. The peripheral speed of a tip end of agitation blades in a case where a media agitating pulverizer is used is preferably from 0.5 to 20 m/s, and more preferably from 1.0 to 15 m/s. Here, the kinds of the pulverizers can be referred to "Kagaku Kogaku no Shinpo Dai 30 Shu Biryushi Seigyo (Advancement in Chemical Engineering, vol. 30, Fine Particle Control)" (edited by The Society of Chemical Engineers, Japan, Tokai Local Branch, published Oct. 10, 1996, Maki Shoten). Also, the treatment method therefor may be either in a batch method or a continuous method.

The materials for the media of the media pulverizers are not particularly limited, and the materials include, for example, iron, stainless steel, alumina, zirconia, silicon carbide, silicon nitride, glass, and the like, and zirconia is preferred from the viewpoint of pulverization efficiency. The shapes of the media are not particularly limited, and include, a ball, a rod, a tube, and the like. Here, a rod refers to a rod-shaped medium, in which a cross section of the rod of a polygonal form such as tetragonal or hexagonal form, a circular form, an elliptic form or the like can be used, and a ball is preferred from the viewpoint of pulverization efficiency.

In a case of a pulverizer where a vessel driving pulverizer is a vibrating mill and media are rod-shaped, the rod has an outer diameter of preferably from 0.5 to 200 mm, more preferably from 1.0 to 100 mm, and even more preferably from 5 to 50 mm. So long as the rod has a size within the range mentioned above, a desired pulverization force is obtained, and at the same time the organic crystal nucleating agent can be effectively finely pulverized without allowing admixture of fragments of the rod to cause soiling of the organic crystal nucleating agent.

Although a filling ratio of the rod differs in favorable filling ratios depending upon the kinds of the vessel driving pulverizers, a filling ratio is within the range of preferably from 10 to 70%, and more preferably from 15 to 60%. So long as the filling ratio are within this range, the contact frequency of the organic crystal nucleating agent and the above-mentioned pulverization aid ester with the rod is improved, whereby the pulverization efficiency can be improved.

Here, the filling ratio refers to an apparent volume of a rod based on the volume of the agitating member of a vessel driving pulverizer. In addition, it is preferable that the rods are used in plurality, from the viewpoint of increasing contact frequency of the organic crystal nucleating agent and the above-mentioned pulverization aid ester with the rod, thereby improving pulverization efficiency.

In addition, in a case of a pulverizer where a media agitating pulverizer is an agitation tank-containing pulverizer and media are a ball, the ball has an outer diameter within the range of preferably from 0.01 to 5 mm, more preferably from 0.02 to 5 mm, and even more preferably from 0.02 to 1 mm. So long as the ball has a size within the range mentioned above, a desired pulverization force is obtained, and at the same time the organic crystal nucleating agent can be effectively finely pulverized without allowing admixture of fragments of the ball to cause soiling of the organic crystal nucleating agent.

Although a filling ratio of the ball differs in favorable filling ratios depending upon the kinds of the agitation tank-containing pulverizers, the filling ratio is within the range of preferably from 10 to 97%, and more preferably from 15 to 95%. So long as the filling ratio are within this range, the contact frequency of the organic crystal nucleating agent and the above-mentioned pulverization aid ester with the ball is improved, and at the same time the pulverization efficiency can be improved without hindering the movement of the media. Here, the filling ratio refers to an apparent volume of a ball based on the volume of the agitating member of the an agitation tank-containing pulverizer.

The treatment time cannot be unconditionally determined because the treatment time depends on the kinds of the pulverizers, the kinds, the size, and the filling ratio of the media, and the like. The treatment time is preferably from 0.01 to 50 hr, more preferably from 0.05 to 30 hr, even more preferably from 0.10 to 20 hr, and still even more preferably from 0.10 to 10 hr, from the viewpoint of finely pulverizing the organic crystal nucleating agent. The treatment temperature is not particularly limited, and the treatment temperature is preferably from 5° to 250° C., and more preferably from 10° to 200° C., from the viewpoint of avoidance of degradation by heat.

Specific embodiments for the wet pulverization in the step (1) include embodiments, including, for example, adding independently or concurrently each of an organic crystal nucleating agent and the carboxylic acid ester and/or the phosphoric ester mentioned above to a media pulverizer, and carry out a wet pulverization.

Thus, an organic crystal nucleating agent composition that is finely pulverized is obtained.

In the present invention, the organic crystal nucleating agent nucleating agent) has a volume-median particle size ($D_{50}$) of preferably from 50 to 700 nm, more preferably from 75 to 680 nm, even more preferably from 100 to 650 nm, even more preferably from 100 to 600 nm, and even more preferably from 200 to 600 nm, from the viewpoint of enhancing crystallization of the polylactic acid resin composition obtainable and heat resistance of a molding article made of the polylactic acid resin composition. For the same reasons, the volume-median particle size ($D_{50}$) of the organic crystal nucleating agent composition is preferably from 20 to 70%, more preferably from 25 to 65%, and even more preferably from 30 to 60%, based on the volume-median particle size ($D_{50}$) of the organic crystal nucleating agent before the wet pulverization.

In addition, the cumulative volume particle size ($D_{90}$) is preferably from 50 to 1400 nm, more preferably from 75 to 1200 nm, even more preferably from 100 to 1000 nm, and even more preferably from 200 to 900 nm. Also, the cumulative volume particle size ($D_{10}$) is preferably from 10 to 600 nm, more preferably from 20 to 500 nm, and even more preferably from 100 to 400 nm. In addition, from the same viewpoint, a ratio of $D_{10}$ to $D_{50}$, i.e. $D_{10}/D_{50}$, is preferably from 0.5 to 1.0, and more preferably from 0.6 to 1.0, and a ratio of $D_{90}$ to $D_{50}$, i.e. $D_{90}/D_{50}$, is preferably from 1.0 to 2.0, and more preferably from 1.0 to 1.8.

In addition, from the same viewpoint, in one embodiment of the organic crystal nucleating agent composition, it is preferable that the volume-median particle size ($D_{50}$) is from 100 to 600 nm, that the cumulative volume particle size ($D_{90}$) is from 100 to 1000 nm, and that the cumulative volume particle size ($D_{10}$) is from 10 to 600 nm, and it is more preferable that the volume-median particle size ($D_{50}$) is from 200 to 600 nm, that the cumulative volume particle size ($D_{90}$) is from 200 to 900 nm, and that the cumulative volume particle size ($D_{10}$) is from 100 to 400 nm. Here, in the present specification, the average particle size of the organic crystal nucleating agent composition means a volume-median particle size ($D_{50}$), which can be measured in accordance with the method described in Examples set forth below. In addition, a cumulative volume particle size ($D_x$) refers to a particle size of particles having a cumulative volume frequency x % counted from a smaller particle size where the cumulative volume frequency is calculated in volume percentage, which can be measured in accordance with the method described in Examples set forth below.

[Step (2)]

The step (2) is a step of melt-kneading a raw material for a polylactic acid resin composition containing the finely pulverized organic crystal nucleating agent composition obtained in the step (1) and a polylactic acid resin.

<Raw Material for Polylactic Acid Resin Composition>

The raw material for a polylactic acid resin composition contains the finely pulverized organic crystal nucleating agent composition obtained in the step (1) and a polylactic acid resin. The finely pulverized organic crystal nucleating agent composition obtained in the step (1) of the raw material for a polylactic acid resin composition is contained in an amount of preferably from 1 to 50 parts by weight, more preferably from 5 to 40 parts by weight, even more preferably from 7 to 30 parts by weight, and even more preferably from 10 to 25 parts by weight, based on 100 parts by weight of the polylactic acid resin, from the viewpoint of crystallization velocity of the polylactic acid resin composition obtainable, and heat resistance of the molded article made of the polylactic acid resin composition. Here, the phrase "amount contained" as used herein means "amount contained or amount blended."

(Polylactic Acid Resin)

The polylactic acid resin in the present invention refers to a polylactic acid, or a copolymer of a lactic acid and a hydroxycarboxylic acid. The hydroxycarboxylic acid includes glycolic acid, hydroxybutyric acid, hydroxyvaleric acid, hydroxypentanoic acid, hydroxycaproic acid, and hydroxyheptanoic acid, and glycolic acid and hydroxycaproic acid are preferred.

Preferred molecular structures of the polylactic acid are those composed of from 80 to 100% by mol of either unit of L-lactic acid (L-form) or D-lactic acid (D-form), and from 0 to 20% by mol of a lactic acid unit in a symmetric form thereof. In addition, the copolymer of a lactic acid and a hydroxycarboxylic acid is composed of from 85 to 100% by mol of either unit of L-lactic acid or D-lactic acid, and from 0 to 15% by mol of a hydroxycarboxylic acid unit.

These polylactic acid resins can be obtained by selecting a structure that is needed from L-lactic acid, D-lactic acid, and a hydroxycarboxylic acid as raw materials, and subjecting the components to dehydration polycondensation. Preferably, the polylactic acid resin is obtained by selecting a structure that is needed from as lactide, which is a cyclic lactic acid dimer, a glycolide, which is a cyclic glycolic acid dimer, caprolactone, or the like, and subjecting the components to a ring-opening polymerization. The lactides include the form of L-lactide, which is a cyclic L-lactic acid dimer; D-lactide, which is a cyclic D-lactic acid dimer; meso-lactide, which is a cyclic dimer of D-lactic acid and L-lactic acid; and DL-lactide, which is a racemic mixture of the D-lactide and the L-lactide. In the present invention, any one of the lactides can be used, and the D-lactide or the L-lactide is preferred as the main raw material.

In the present invention, it is preferable to use a polylactic acid resin having a high optical purity of the lactic acid component, from the viewpoint of moldability of the polylactic acid resin composition. Specifically, L-form or D-form is contained in an amount of preferably 80% or more, L-form or D-form is contained in an amount of more preferably 90% or more, L-form or D-form is contained in an amount of even more preferably 95% or more, L-form or D-form is contained in an amount of even more preferably 98% or more, and L-form or D-form is contained in an amount of even more preferably 99% or more, of the entire lactic acid component of the polylactic acid resin.

In addition, in the present invention, as the polylactic acid, a stereocomplex polylactic acid, composed of two kinds of polylactic acids, each obtained from a lactic acid component containing an isomer different from one another as a main component, may be used, from the viewpoint of moldability and transparency of the polylactic acid resin composition, and satisfaction of both strength and flexibility of the molded article made of the polylactic acid resin composition, and heat resistance. One polylactic acid constituting the stereocomplex polylactic acid [hereinafter referred to as "polylactic acid (A)"] contains L-form in an amount of from 90 to 100% by mol, and other component including D-form in an amount of from 0 to 10% by mol. The other polylactic acid [hereinafter referred to as "polylactic acid (B)"] contains D-form in an amount of from 90 to 100% by mol, and other component including L-form in an amount of from 0 to 10% by mol. Other components besides L-form and the D-form include dicarboxylic acids, polyhydric alcohols, hydroxycarboxylic acids, lactone, and the like, each having a functional group capable of forming two or more ester bonds. Also, other components may be a polyester, a polyether, a polycarbonate, or the like, each having two or more unreacted functional groups mentioned above in one molecule.

The polylactic acid (A) and the polylactic acid (B) in the stereocomplex polylactic acid are in a weight ratio, i.e. polylactic acid (A)/polylactic acid (B), of preferably from 10/90 to 90/10, more preferably from 20/80 to 80/20, and even more preferably from 40/60 to 60/40.

The polylactic acid resin has a weight-average molecular weight of preferably 100,000 or more, from the viewpoint of mechanical properties of the molded article made of the polylactic acid resin composition, and the polylactic acid resin has a weight-average molecular weight of preferably 400,000 or less, from the viewpoint of fluidity during the molding of the polylactic acid resin composition. Here, the weight-average molecular weight of the polylactic acid resin can be obtained by using gel permeation chromatography (GPC), in which chloroform is used as a solvent, a high-temperature SEC column (GMHHR-H Series) manufactured by Tosoh Corporation as a column, a flow rate of 1.0 mL/min, a column temperature of 40° C., a differential refractive index detector (RI) as a detector, and calculating using styrene having a known molecular weight as a reference.

Here, the polylactic acid can be synthesized in accordance with a known method, or commercially available manufactured products can be used. Commercially available products include, for example, trade name: LACEA (manufactured by Mitsui Chemicals, Inc.), trade name: Ecoplastic U'z (manufactured by TOYOTA MOTOR CORPORATION), trade name: Nature Works (manufactured by Nature Works), trade name: REVODE (manufactured by Zhejiang Hisun Biomaterials Co., Ltd.), and the like. In addition, among the above-mentioned commercially available products, trade names LACEA H-100, H-400, H-440 (manufactured by Mitsui Chemicals, Inc.), trade names Ecoplastic U'z S-9, S-12, and S-17 (manufactured by TOYOTA MOTOR CORPORATION), trade names Nature Works 4032D and 3001D (manufactured by Nature Works) are preferred, from the viewpoint of moldability.

The polylactic acid resin in the polylactic acid resin composition of the present invention is contained in an amount of preferably 50% by weight or more, and more preferably 70% by weight or more, from the viewpoint of achieving the objectives of the present invention.

The polylactic acid resin composition of the present invention may further contain, in addition to the above-mentioned finely pulverized organic crystal nucleating agent composition and the above-mentioned polylactic acid resin, a crystal nucleating agent, a plasticizer, a hydrolysis inhibitor, or the like in a proper amount.

(Crystal Nucleating Agent)

In the present invention, the polylactic acid resin composition may contain other crystal nucleating agent together with the above-mentioned finely pulverized organic crystal nucleating agent, from the viewpoint of further improving a crystallization velocity of the polylactic acid resin composition of the present invention, and improving heat resistance and moldability of the molded article made of the polylactic acid resin composition. It is preferable that other crystal nucleating agents are compounds having hydroxyl group or groups and amide group or groups in one molecule, from the viewpoint of a crystallization velocity of the polylactic acid resin composition, and heat resistance of the molded article made of the polylactic acid resin composition. The above-mentioned crystal nucleating agent can further improve a crystallization velocity and heat resistance of the polylactic acid resin composition obtainable by dissolving the crystal nucleating agent during the melt-kneading of the polylactic acid resin to form a large number of crystal nuclei, and at the same time interactions with the above-mentioned finely pulverized organic crystal nucleating agent.

The compounds having hydroxyl group or groups and amide group or groups in one molecule are preferably an aliphatic amide having hydroxyl group or groups, and more preferably an aliphatic amide having molecule, from the viewpoint of a crystallization velocity of the polylactic acid resin composition, and compatibility with the polylactic acid resin and impact resistance and moldability of the polylactic acid resin composition.

The compounds having hydroxyl group or groups and amide group or groups in one molecule have a melting point of preferably 65° C. or higher, more preferably from 70° to 220° C., and even more preferably from 80° to 190° C., from the viewpoint of improving dispersibility of the crystal nucleating agent during kneading, and improving a crystallization velocity. The melting point of the crystal nucleating agent as used herein is measured by a method described in Examples described later.

Specific examples of the compounds having hydroxyl group or groups and amide group or groups in one molecule include hydroxyfatty acid monoamides such as 12-hydroxystearic acid monoethanolamide; hydroxyfatty acid bisamides such as methylenebis 12-hydroxystearic amide, ethylenebis 12-hydroxystearic amide, and hexamethylenebis 12-hydroxystearic amide; hydroxyfatty acid triamides such as 12-hydroxystearic acid triglyceride; and the like. The hydroxyfatty acid bisamides such as ethylenebis 12-hydroxystearic amide and hexamethylenebis 12-hydroxystearic amide, and the 12-hydroxystearic acid triglyceride are preferred, and ethylenebis 12-hydroxystearic amide is more preferred, from the viewpoint of moldability of the polylactic acid resin composition, heat resistance and impact resistance of the molded article made of the polylactic acid resin composition, and anti-blooming property of the crystal nucleating agent.

The compounds having hydroxyl group or groups and amide group or groups in one molecule and the finely pulverized organic crystal nucleating agent are in a weight ratio, i.e. the compounds having hydroxyl group or groups and amide group or groups in one molecule/the finely pulverized organic crystal nucleating agent, of preferably from 0.5/99.5 to 20/80, more preferably from 0.5/99.5 to 17/83, even more preferably from 1.0/99.0 to 10/90, and still even more preferably from 3/97 to 8/92, from the viewpoint of increasing a crystallization velocity of the polylactic acid resin, and from the viewpoint of increasing moldability of the polylactic acid resin composition, and heat resistance of the molded article made of the polylactic acid resin composition.

The crystal nucleating agent other than the finely pulverized organic crystal nucleating agent in the polylactic acid resin composition is contained in an amount of preferably from 0.1 to 5 parts by weight, more preferably from 0.5 to 3 parts by weight, and even more preferably from 0.5 to 2 parts by weight, based on 100 parts by weight of the polylactic acid resin, from the viewpoint of heat resistance, impact resistance, and moldability of the molded article made of the polylactic acid resin composition.

(Plasticizer)

In the present invention, the polylactic acid resin composition can contain a plasticizer, from the viewpoint of further improving transparency and moldability of the polylactic acid resin composition. In the present invention, the finely pulverized organic crystal nucleating agent obtained by subjecting an organic crystal nucleating agent to wet pulverization in the presence of the above-mentioned pulverization aid ester in the step (1) is melt-kneaded with a polylactic acid resin in the step (2), so that the pulverization aid ester existing on the surface of the finely pulverized organic crystal nucleating agent acts as a plasticizer, whereby a polylactic acid resin composition having a favorable crystallization velocity and heat resistance can be obtained without separately adding a plasticizer in the melt-kneading step.

As the plasticizer, the same ones as the pulverization aid ester used in the step (1) can be used, and the plasticizer and the pulverization aid ester are contained in a total amount of preferably from 0.05 to 3 parts by weight, and more preferably from 0.10 to 2 parts by weight, based on 100 parts by weight of the polylactic acid resin, from the viewpoint of heat resistance, transparency, and moldability of the molded article made of the polylactic acid resin composition.

(Hydrolysis Inhibitor)

The polylactic acid resin composition of the present invention can further contain a hydrolysis inhibitor, from the viewpoint of improving durability and hydrolysis resistance. The hydrolysis inhibitor includes carbodiimide compounds such as polycarbodiimide compounds and monocarbodiimide compounds, and the polycarbodiimide compounds are preferred from the viewpoint of durability and impact resistance of the polylactic acid resin composition, and the monocarbodiimide compounds are preferred from the viewpoint of durability and moldability (fluidity) of the polylactic acid resin composition. It is preferable that the monocarbodiimide compound and the polycarbodiimide compound are used together, from the viewpoint of even more improving durability, impact resistance, and moldability of the molded article made of the polylactic acid resin composition.

The polycarbodiimide compound includes poly(4,4'-diphenylmethanecarbodiimide), poly(4,4'-dicyclohexylmethanecarbodiimide), poly(1,3,5-triisopropylbenzene) polycarbodiimide, poly(1,3,5-triisopropylbenzene and 1,5-diisopropylbenzene)polycarbodiimide, and the like. The monocarbodiimide compound includes N,N'-di-2,6-diisopropylphenylcarbodiimide, and the like.

In order to satisfy durability, impact resistance, and moldability of the molded article made of the polylactic acid resin composition, the above-mentioned carbodiimide compounds may be used alone or in a combination of two or more kinds. In addition, as the poly(4,4'-dicyclohexylmethanecarbodiimide), Carbodilite LA-1 (manufactured by Nisshin Boseki) can be purchased and used; as the poly(1,3,5-triisopropylbenzene)polycarbodiimide and poly(1,3,5-triisopropylbenzene and 1,5-diisopropylbenzene)polycarbodiimide, Stabaxol P and Stabaxol P-100 (manufactured by Rhein Chemie) can be purchased and used; and as N,N'-di-2,6-diisopropylphenylcarbodiimide, Stabaxol 1 (manufactured by Rhein Chemie) can be purchased and used, respectively.

The hydrolysis inhibitor is contained in an amount of preferably from 0.05 to 3 parts by weight, and more preferably from 0.10 to 2 parts by weight, based on 100 parts by weight of the polylactic acid resin, from the viewpoint of transparency and moldability of the molded article made of the polylactic acid resin composition.

In addition, the polylactic acid resin composition of the present invention contains, in addition to those mentioned above, an inorganic filler, from the viewpoint of further improving the physical properties such as rigidity.

(Inorganic Filler)

As the inorganic filler, the filler in the form of fibers, plates, granules, or powders which are ordinarily usable in the reinforcement of a thermoplastic resin can be used. Specific examples include fibrous inorganic fillers such as glass fiber, asbestos fiber, carbon fiber, graphite fiber, metal fiber, potassium titanate whisker, aluminum borate whisker, magnesium-based whisker, silicon-based whisker, wollastonite, sepiolite, asbestos, slag fiber, xonotlite, ellestadite, gypsum fiber, silica fiber, silica alumina fiber, zirconia fiber, boron nitride fiber, silicon nitride fiber, and boron fiber; inorganic fillers in the form of plates or granules, such as glass flake, non-swellable mica, swellable mica, graphite, metal foil, ceramic beads, talc, clay, mica, sericite, zeolite, bentonite, organic modified bentonite, organic modified montmorillonite, dolomite, kaolin, fine silicic acid powder, feldspar powder, potassium titanate, silica balloon, calcium carbonate, magnesium carbonate, barium sulfate, calcium oxide, aluminum oxide, titanium oxide, aluminum silicate, silicon oxide, gypsum, novaculite, dawsonite, and white clay. Among these inorganic fillers, carbon fiber, glass fiber, wollastonite, mica, talc, and kaolin are preferred. In addition, the fibrous filler has an aspect ratio of preferably 5 or more, more preferably 10 or more, and even more preferably 20 or more.

The above-mentioned inorganic filler may be subjected to a coating or binding treatment with a thermoplastic resin such as an ethylene/vinyl acetate copolymer, or with a thermosetting resin such as an epoxy resin, or the inorganic filler may be treated with a coupling agent such as amino silane or epoxy silane.

The inorganic filler is contained in an amount of preferably from 1 to 100 parts by weight, and more preferably from 5 to 50 parts by weight, based on 100 parts by weight of the polylactic acid resin.

(Organic Filler)

In addition, it is preferable that the polylactic acid resin composition of the present invention further contains, in addition to those mentioned above, an organic filler, from the viewpoint of improving physical properties such as rigidity.

As the organic filler, the filler in the form of chips, fibers, plates or powders that are ordinarily usable in reinforcement of a thermoplastic resin can be used. Specific examples thereof include those in the form of chips such as husks, wood chips, bean-curd refuse, wastepaper-crushed material, and clothing crushed material; those in the form of fibers, such as plant fibers such as cotton fiber, flax fiber, bamboo fiber, wood fiber, kenaf fiber, jute fiber, banana fiber, or coconut fiber, or pulps or cellulose fiber processed from these plant fibers, and animal fibers such as silk, wool, Angora, cashmere, or camel; those in the form of powders such as pulp powder, paper powder, wood powder, bamboo powder, cellulose powder, husk powder, fruit shell powder, chitin powder, chitosan powder, protein, or starch. Those in the form of powders such as paper powder, wood powder, bamboo powder, cellulose powder, kenaf powder, husk powder, fruit shell powder, chitin powder, chitosan powder, protein powder, or starch powder are preferred, and paper powder, wood powder, bamboo powder, cellulose powder, and kenaf powder are more preferred, from the viewpoint of moldability. In addition, it is preferable to use an organic filler in the form of a powder in which a cellulose is amorphized with a vibrating rod mill, a beads mill or the like, from the viewpoint of improving toughness.

The organic filler is contained in an amount of preferably from 1 to 100 parts by weight, and more preferably from 5 to 50 parts by weight, based on 100 parts by weight of the polylactic acid resin.

(Other Resins and Additives)

The polylactic acid resin composition of the present invention can contain a high-strength organic synthetic fiber, from the viewpoint of improving physical properties such as strength, heat resistance, and impact resistance of the molded article made of the polylactic acid resin composition. Specific examples of the high-strength organic synthetic fiber include aramide fiber, polyarylate fiber, PBO fiber, and the like, and the aramide fiber is preferred, from the viewpoint of heat resistance. The high-strength organic synthetic fiber is contained in an amount of preferably from 3 to 20 parts by weight, and more preferably from 5 to 10 parts by weight, based on 100 parts by weight of the polylactic acid resin.

The polylactic acid resin composition of the present invention can contain other resins, from the viewpoint of improving physical properties such as rigidity, flexibility, heat resistance, and durability of the molded article made of the polylactic acid resin composition. Specific examples of other resins include thermoplastic resins such as polyethylene, polypropylene, polystyrene, ABS resins, AS resins, acrylic resins, polyamides, polyphenylene sulfide, polyether ether ketone, polyesters, polyacetals, polysulfone, polyphenylene oxide, polyimide, polyetherimide, and the like, or flexible thermoplastic resins such as ethylene/glycidyl methacrylate copolymers, polyester elastomers, polyamide elastomers, ethylene/propylene terpolymers, ethylene/buten-1-e copolymers; thermosetting resins such as phenol resins, melamine resins, unsaturated polyester resins, silicone resins, and epoxy resins; and the like. Among them, a resin which has a bond containing a carbonyl group, such as amide bond, an ester bond, or carbonate bond is preferred, because the resin is likely to have a structurally high affinity with a polylactic acid resin, from the viewpoint of compatibility with the polylactic acid resin.

The polylactic acid resin composition of the present invention can further contain a flame retardant, from the viewpoint of improving physical properties such as rigidity, flexibility, heat resistance, and durability of the molded article made of the polylactic acid resin composition. Specific examples of the flame retardant include halogen-containing compounds, containing bromine or chlorine, such as tetrabromobisphenol-A-epoxy oligomer, tetrabromobisphenol-A-carbonate oligomer, and brominated epoxy resin; inorganic flame retardants such as antimony trioxide and zinc borate; silicone-based flame retardants such as silicone resins and silicone oil; inorganic hydrates such as aluminum hydroxide and magnesium hydroxide (preferably surface-treated with a silane coupling agent, especially isocyanate silane, from the viewpoint of physical properties); phosphorus-containing compounds such as triarylisopropyl phosphate, condensed phosphoric ester, melamine polyphosphoric acid, piperazine polyphosphoric acid, and phosphazene compounds; and nitrogen-containing compounds such as melamine cyanurate; and the like, and the inorganic hydrate or the phosphorus-containing compound is preferred from the viewpoint of safety, and a combined use of the inorganic hydrate and the phosphorus-containing compound is preferred from the viewpoint of physical properties. The flame retardant is contained in an amount of preferably from 10 to 60 parts by weight, and more preferably from 15 to 50 parts by weight, based on 100 parts by weight of the polylactic acid resin.

The polylactic acid resin composition of the present invention may contain a core-shell shaped rubber, from the viewpoint of improving physical properties such as impact resistance and toughness of the molded article made of the polylactic acid resin composition. Specific examples thereof include (core: silicone/acrylic polymer, shell: methyl methacrylate polymer), (core: silicone/acrylic polymer, shell: methyl methacrylate/glycidyl methacrylate polymer), (core: butadiene/styrene polymer, shell: methyl methacrylate polymer), (core: acrylic polymer, shell: methyl methacrylate polymer), and the like. As a commercially available product, METABLEN S-2006, S-2100, S-2200, manufactured by Mitsubishi Rayon, PARALOID BPM-500, manufactured by Rohm and Haas are preferred, from the viewpoint of transparency. The core-shell shaped rubber is contained in an amount of preferably from 2 to 30 parts by weight, more preferably from 3 to 20 parts by weight, based on 100 parts by weight of the polylactic acid resin.

The polylactic acid resin composition of the present invention can further contain, in addition to those mentioned above, a hindered phenol-based or phosphite-based antioxidant, or a lubricant such as an aliphatic amide, a metal salt of a fatty acid, a hydrocarbon-based wax or an anionic surfactant. Each of the antioxidant or lubricant is contained in an amount of preferably from 0.05 to 3 parts by weight, and more preferably from 0.10 to 2 parts by weight, based on 100 parts by weight of a polylactic acid resin.

The polylactic acid resin composition of the present invention can further contain, as other components besides those mentioned above, one or more of ordinary additives, including, for example, ultraviolet absorbents such as benzophenone compounds, benzotriazole compounds, aromatic benzoate compounds, oxalic acid anilide compounds, cyanoacrylate compounds, and hindered amine compounds, thermal stabilizers such as hindered phenol compounds, phosphite compounds, and thioether compounds, antistatic agents, anti-clouding agents, photostabilizers, blowing agents, mold releasing agents, colorants including dyes and pigments, mildewproof agents, and bactericidal agents, within the range that would not impair the objective of the present invention.

The step (2) is a step of melt-kneading a raw material for a polylactic acid resin composition containing the above-mentioned finely pulverized organic crystal nucleating agent composition, the polylactic acid resin, and optionally various additives, and specifically, the step includes a step of melt-kneading the components at 160° to 250° C. with a twin-screw extruder or the like. In addition, the melt-kneading temperature is preferably from 160° to 250° C., more preferably from 165° to 230° C., even more preferably from 170° to 210° C., and still even more preferably from 170° to 200° C., from the viewpoint of moldability and degradation inhibition of the polylactic acid resin composition.

Thus, the polylactic acid resin composition is obtained according to the method of the present invention. Accordingly, the present invention also provides a polylactic acid resin composition obtainable by the method of the present invention. The polylactic acid resin composition of the present invention has some advantages that the polylactic acid resin composition has excellent workability and can be worked at a low temperature of, for example, 200° C. or lower, so that the degradation of the pulverization aid ester and the plasticizer mentioned above are less likely to take place, whereby the polylactic acid resin composition can be used in various applications by molding into films and sheets. Further, the polylactic acid resin composition has an even higher crystallization velocity, so that molding can be carried out at a low die temperature and in a short time period in the injection molding.

<Polylactic Acid Resin Molded Article and Production Method Thereof>

The molded article of the polylactic acid resin of the present invention is obtainable by molding a polylactic acid resin composition of the present invention. Specifically, the finely pulverized organic nucleating agent composition and the polylactic acid resin mentioned above are mixed using an extruder or the like, and while melting the components, a plasticizer or a hydrolysis inhibitor or the like is blended therewith as needed, and a molten product obtained is subsequently filled in a die and molded with an injection-molding machine or the like.

A preferred method for producing a molded article of a polylactic acid resin of the present invention is a method including the steps of subjecting an organic crystal nucleating agent to a wet pulverization in the presence of the above-mentioned pulverization aid ester, to give a finely pulverized organic crystal nucleating agent composition [step (1)]; melt-kneading a raw material for a polylactic acid resin composition containing the finely pulverized organic crystal nucleating agent composition obtained in the step (1) and a polylactic acid resin [step (2)]; and filling a molten product obtained in the step (2) in a die at 110° C. or lower, and molding the molten product [step (3)].

In the present invention, a method including the steps of, subsequent to the step (2), cooling the product to make it in an amorphous state, in other words, a state where a degree of crystallinity as measured by a wide angle X-ray diffraction method is 1% or less, and thereafter carrying out the step (3), or a method including the steps of, subsequent to the step (2), cooling the product and immediately carrying out the step (3) is preferred. The method including the steps of, subsequent to the step (2), cooling the product and immediately carrying out the step (3) is more preferred, from the viewpoint of exhibiting an effect of improving a crystallization velocity of the polylactic acid resin.

Specific examples of the step (3) include, for example, a step of filling a polylactic acid resin composition of the present invention in a die at 110° C. or lower, and molding the composition with an injection-molding machine or the like. The die temperature in the step (3) is preferably 110° C. or lower, more preferably 90° C. or lower, and even more preferably 80° C. or lower, from the viewpoint of improving a crystallization velocity of the polylactic acid resin composition and improving workability. Also, the die temperature is preferably 30° C. or higher, more preferably 40° C. or higher, and even more preferably 60° C. or higher. From the above viewpoint, the die temperature is preferably from 30° to 110° C., more preferably from 40° to 90° C., and even more preferably from 60° to 80° C. The polylactic acid resin composition of the present invention has an excellent crystallization velocity and is capable of working at low temperatures, a molded article having sufficient heat resistance can be obtained even at the above-mentioned die temperature.

The retention time in the die in the step (3) is preferably from 20 to 90 seconds, more preferably from 20 to 80 seconds, and even more preferably 20 to 60 seconds, from the viewpoint of heat resistance and productivity of the molded article made of the polylactic acid resin composition. In other words, since the polylactic acid resin composition obtained by the method of the present invention has a high crystallization velocity, a molded article having sufficient heat resistance, made of the polylactic acid resin composition can be obtained even with a short retention time as mentioned above.

The heat resistance of the molded article made of the polylactic acid resin composition is proportional to the size of the relative crystallinity. Here, the term relative crystallinity as used herein refers to a crystallinity that is expressed by the following formula:

$$\text{Relative Crystallinity (\%)} = \{(\Delta Hm - \Delta Hcc)/\Delta Hm \times 100\}$$

Specifically, the relative crystallinity can be obtained with a DSC apparatus (Diamond DSC, commercially available from Perkin-Elmer), using $\Delta Hcc$, which is an absolute value of a cold crystallization enthalpy of a polylactic acid resin observed in 1st RUN and $\Delta Hm$, melt crystallization enthalpy observed in 2nd RUN, wherein 1st RUN includes the steps of heating from 20° to 200° C. at a heating rate of 20° C./minute, holding at 200° C. for 5 minutes, cooling from 200° to 20° C. at a cooling rate of −20° C./minute, holding at 20° C. for 1 minute, and 2nd RUN includes, after 1st RUN, the step of heating from 20° to 200° C. at a heating rate of 20° C./minute.

EXAMPLES

The following examples further describe and demonstrate embodiments of the present invention. The examples are given solely for the purposes of illustration and are not to be construed as limitations of the present invention. Parts in Examples are parts by weight, unless specified otherwise.

[Weight-Average Molecular Weight (Mw) of Polylactic Acid Resin]

The weight-average molecular weight (Mw) is measured in accordance with GPC (gel permeation chromatography), under the following measurement conditions.

<Measurement Conditions>
Column: GMHHR-H+GMHHR-H
Column Temperature: 40° C.
Detector: RI
Eluent: chloroform
Flow Rate: 1.0 mL/min
Sample Concentration: 1 mg/mL
Amount Injected: 0.1 mL
Calculation standard: polystyrene

[Optical Purity of Polylactic Acid]

The optical purity of a polylactic acid is measured in accordance with the measurement method for D-form content described in "*Poriorefin-toh Gosei-jushi-sei Shokuhin Youki Houso-toh ni Kansuru Jishukijun (Self-Standards Concerning Food Containers and Wrappings Made of Synthetic Resins Such as Polyolefins)*," Revised Third Edition, supplemented in June, 2004, Chapter 3 Eisei Shikenho (Hygienic Test Method), p. 12-13" under the following measurement conditions. Specifically, 10 mL of 0.7 mol/L sodium hydroxide in methanol is added to an accurately weighed polylactic acid (500 mg), and a mixture is set in a water bath shaking machine set at 65° C., and allowed to be hydrolyzed until the resinous components are formed into a homogeneous solution. Further, a diluted hydrochloric acid (2 mol/L hydrochloric acid) is added to an alkaline solution after hydrolysis is completed to neutralize, and the hydrolyzed solution is diluted to a certain volume with pure water. Thereafter, a given volume of the dilution is separated in a volumetric flask, and the separated solution is diluted with a mobile phase solution for high-performance liquid chromatography (HPLC). The pH of the dilution is adjusted to a range of from 3 to 7, and the dilution in the volumetric flask is quantified, and filtered with a membrane filter (0.45 μm). The resulting prepared solution is quantified for D-lactic acid and L-lactic acid in accordance with HPLC, whereby optical purity of the polylactic acid resin can be obtained.

<Measurement Conditions for HPLC>
Column: Optically Resolution Column
    SUMICHIRAL OA6100 (46 mmφ×150 mm, 5 μm), manufactured by Sumika Chemical Analysis Service, Ltd.
Pre-Column: Optically Resolution Column
    SUMICHIRAL QA6100 (4 mmφ×10 mm, 5 μm), manufactured by Sumika Chemical Analysis Service, Ltd.
Column Temperature: 25° C.
Mobile Phase: 2.5% Methanol-containing 1.5 mM aqueous copper sulfate solution
Flow Rate of Mobile Phase: 1.0 mL/minute
Detector: Ultraviolet Detector (UV 254 nm)
Amount of Injection: 20 μL

[Melting Point of Crystal Nucleating Agent]

The melting point is measured with a DSC apparatus (Diamond DSC, manufactured by Perkin-Elmer) by heating a sample from 20° to 500° C. at a heating rate of 10° C./minute.

[Particle Size of Crystal Nucleating Agent]

The particle size (nm) of the crystal nucleating agent is measured by diluting a crystal nucleating agent so as to have a concentration of 0.5% by weight with ethanol (Cica first grade, manufactured by KANTO CHEMICAL CO., INC.), dispersing the dilution with a ultrasonicator (device name:

1510J-MT, manufactured by Yamato Kagaku) for 5 minutes, charging a glass cell (optical path length 10 mm×width 10 mm×height 45 mm, glass 2-sided transparent cell, manufactured by Sansyo Co., Ltd.) up to a height of 10 mm from the bottom with a solution obtained, and carrying out the measurement at 25° C. using Zetasizer Nano-S (manufactured by SYSMEX CORPORATION, dynamic light scattering measurement instrument).

[Viscosity of Carboxylic Acid Ester and Phosphoric Ester]

The viscosity is measured at 23° C. with BII-type viscometer BLII (manufactured by TOKI SANGYO CO., LTD.) on the basis of the method for measuring viscosity according to S-method as prescribed in JIS K7117 (rotational speed: 12 r/min)

[Weight-Average Molecular Weight of (Mw) of Carboxylic Acid Ester and Phosphoric Ester]

The weight-average molecular weight (Mw) is measured in accordance with GPC (gel permeation chromatography), under the following measurement conditions.

<Measurement Conditions>
Column: TSKPWXL+G4000PWXL+G2500PWXL (all manufactured by Tosoh Corporation)
Column Temperature: 40° C.
Detector: RI (210 nm)
Eluent: 0.2 mol/L phosphate buffer/acetonitrile (9/1)
Flow Rate: 10 mL/min
Sample Concentration: 1 mg/mL
Amount Injected: 0.1 mL
Standard: polyethylene glycol Production Example 1 for Organic Crystal Nucleating Agent Barium di(dimethyl 5-Sulfoisophthalate)

A reactor equipped with a stirrer was charged with 296 g of sodium dimethyl 5-sulfoisophthalate and 2,000 g of ion-exchanged water, and the contents were heated to 80° C. while stirring to dissolve. Thereto was gradually added dropwise a solution prepared by dissolving 104 g barium chloride in 900 g of ion-exchanged water under stirring. After cooling the mixture to 30° C., the formed white particles were filtered, and the white particles obtained were dispersed in 3,000 g of ion-exchanged water. The dispersion was heated to 80° C. and kept thereat for 1 hour, and thereafter cooled to 30° C., and a white powder was separated by filtration and washed. Similar washing procedures were carried out another time, and the white powder was then dried at 120° C. for 5 hours, to give 297 g of a white powder of barium di(dimethyl 5-sulfoisophthalate).

Production Example 2 for Organic Crystal Nucleating Agent p-Xylylenebis Rosin Acid Amide A reaction vessel equipped with a condenser tube and a stirring device was charged with 21.8 g (0.16 mol) of p-xylylenediamine and 256.6 g of tetrahydrofuran to dissolve, and thereto was added dropwise a solution prepared by mixing 26.1 g (0.08 mol) of dehydroabietic acid chloride and 130.5 g of tetrahydrofuran while stirring at room temperature over one and a half hours. After stirring the contents overnight, a liquid reaction mixture was filtered to remove by-products. About 40 g of crude crystals obtained by distilling away the tetrahydrofuran from the filtrate was dissolved in 1,200 g of methyl isobutyl ketone, the solution was washed with a 10% hydrochloric acid, and then with ion-exchanged water. After drying the solution with magnesium sulfate, a liquid reaction mixture was concentrated to a total weight of 430 g, and then allowed to recrystallize. Twenty-seven grams of the crude crystals obtained were dissolved in 400 g of methyl isobutyl ketone, concentrated to a total weight of 300 g, and then allowed to recrystallize. The crude crystals were dried under a reduced pressure at 100° C. to provide 13.6 g of p-xylylenebis rosin acid amide.

Production Example 1 of Carboxylic Acid Ester

Diester Formed Between Succinic Acid and Triethylene Glycol Monomethyl Ether

A 3-L flask equipped with a stirrer, a thermometer, and a dehydration tube was charged with 500 g of succinic anhydride, 2463 g of triethylene glycol monomethyl ether, and 9.5 g of paratoluenesulfonic acid monohydrate, and the contents were reacted at 110° C. for 15 hours under a reduced pressure (4 to 10.7 kPa), while blowing nitrogen (500 mL/min) into a space portion. The liquid reaction mixture had an acid value of 1.6 (KOH mg/g). To the liquid reaction mixture was added 27 g of an adsorbent KYOWAAD 500SH (manufactured by Kyowa Chemical Industry Co., Ltd.), and the mixture was stirred at 80° C. and 2.7 kPa for 45 minutes, and filtered. Thereafter, triethylene glycol monomethyl ether was distilled off at a liquid temperature of from 115° to 200° C. and a pressure of 0.03 kPa, and after cooling to 80° C., the residue was filtered in vacuo, to provide a diester formed between succinic acid and triethylene glycol monomethyl ether [$(MeEO_3)_2SA$] as a filtrate. The diester obtained had a weight-average molecular weight of 410, a viscosity at 23° C. of 27 mPa·s, an acid value of 0.2 KOH mg/g, a saponification value of 274 KOH mg/g, a hydroxyl value of 1 KOH mg/g or less, and a hue APHA of 200.

Production Example 2 of Carboxylic Acid Ester

Triester Compound Formed Between Acetic Acid and Ethylene Oxide Adduct of Glycerol Added with 6 mol of Ethylene Oxide An autoclave was charged with given amounts of a concentrated glycerol for cosmetics manufactured by Kao Corporation and ethylene oxide in a molar ratio of 6 mol of ethylene oxide per one mol of the concentrated glycerol, and the contents were reacted at 150° C. with applying a constant pressure of a reaction pressure of 0.3 MPa using 1% by mol KOH as a catalyst until the pressure becomes constant. Thereafter, the reaction mixture was cooled to 80° C., to provide a catalyst-non-neutralized product. To this product was added a catalyst which is an adsorbent KYOWAAD 600S (manufactured by Kyowa Chemical Industry Co., Ltd.), in an amount 8 times the weight of the catalyst to carry out an adsorption treatment in the presence of nitrogen for 80° C. for 1 hour. Further, the adsorbent was filtered off from the liquid mixture after the treatment with a Buchner funnel fitted with a No. 2 filter paper pre-coated with Radiolite #900, to provide an ethylene oxide (6 mol) adduct of glycerol (hereinafter referred to as POE(6) glycerol. A four-neck flask was charged with this product, and the contents were heated to 105° C., and stirred at 300 r/min. Acetic acid anhydride was added dropwise over about an hour in a given amount in a ratio of 7.2 mol of acetic acid anhydride per one mol of POE(6) glycerol, and the components were reacted. After the dropwise addition, the reaction mixture was aged at 110° C. for 2 hours, and further aged at 120° C. for 1 hour. After aging, unreacted acidic acid anhydride and a by-product acetic acid were topped off under a reduced pressure, and the residue was further steamed, to provide POE(6) glycerol triacetate. The POE(6) glycerol triacetate obtained had a weight-average molecular weight of 490 and a viscosity at 23° C. of 79 mPa·s.

Production Example 3 of Carboxylic Acid Ester

Polyester-Polyol

A 1-liter glass reactor equipped with a reflux condenser, a heating device, a thermometer, a pressure gauge and the like was charged with 478 g of succinic acid and 668 g of triethylene glycol, and a space portion of the reactor was replaced with a nitrogen gas. Thereafter, the contents of the reactor were heated to initiate the reaction. Thereafter, the internal temperature was raised from 200° to 210° C. over 2 hours, and the contents were kept at this temperature until the termination of the reaction. On the other hand, the pressure inside the reactor was maintained at 87 kPa at a degree of vacuum against a normal pressure from a time point at which the internal temperature was 180° C. up to a point where the internal temperature reached 200° C. Thereafter, the reactor was charged with 0.05% by weight of tetraisopropyl titanate (based on a total amount charged) as a catalyst, and the pressure was gradually reduced to 4 kPa over 4 hours within the range in which the raw material alcohol was not distilled off, and this pressure was kept until the reaction was terminated. A part of the composition was taken out to measure an acidic value. Having confirmed that the acidic value is less than 2.0 mg KOH/g, the reaction was terminated, to provide 1 kg of an esterification reaction product. The esterified product had an acid value of 0.9 mg KOH/g, a hydroxyl value of 51 mg KOH/g, a water content of 0.04 g, a weight-average molecular weight of 2,200, and a viscosity at 23° C. of 21,000 mPa·s.

Production Example 4 of Carboxylic Acid Ester

Triester Formed Between 1,3,6-Hexanetricarboxylic Acid and Triethylene Glycol Monomethyl Ether A 1-L flask equipped with a stirrer, a thermometer, and a dehydration tube was charged with 139 g of 1,3,6-hexanetricarboxylic acid, 376 g of triethylene glycol monomethyl ether, and 1.59 g of dibutyltin oxide, and the contents were reacted at 185° C. for 12 hours. After the termination of the reaction, 1.2 g of 85% phosphoric acid was added thereto, and the mixture was heated at 70° C. for 30 minutes while stirring. Thereafter, KYOWAAD 600S (manufactured by Kyowa Chemical Industry Co., Ltd.) was added thereto to carry out an adsorption treatment, and the adsorbed mixture was filtered under pressure. Further, excess triethylene glycol was distilled off under a reduced pressure, and the residue was filtered under pressure, to provide a triester formed between 1,3,6-hexanetricarboxylic acid and triethylene glycol monomethyl ether. The triester obtained had a weight-average molecular weight of 656 and a viscosity at 23° C. of 40 mPa·s.

Production Example 5 of Carboxylic Acid Ester

Diester Formed Between Dimethyl Succinate and Diethylene Glycol

A four-neck flask (equipped with a stirrer, a thermometer, a dropping funnel, a distillation tube, and a nitrogen gas inlet tube) was charged with 999 g (9.41 mol) of diethylene glycol and 23.6 g of a methanol solution containing 28% by weight of sodium methoxide (sodium methoxide: 0.122 mol) as a catalyst, and methanol was distilled off at a normal pressure (101.3 kPa) and 120° C. for 0.5 hours, while stirring. Thereafter, 4125 g (28.2 mol) of dimethyl succinate (manufactured by Wako Pure Chemical Industries, Ltd.) was added dropwise thereto over 3 hours, and methanol formed by the reaction was distilled off at a normal pressure and 120° C. Next, the residue was cooled to 75° C., and the pressure was gradually reduced from a normal pressure to 6.7 kPa over 2 hours to distill off methanol. Thereafter, the pressure was returned to a normal pressure, and further 4.4 g of a methanol solution containing 28% by weight sodium methoxide (sodium methoxide: 0.023 mol) was added as a catalyst. The pressure was gradually reduced from a normal pressure to 2.9 kPa over 2 hours at 100° C. to distill off methanol. Thereafter, the residue was cooled to 80° C., 41 g of KYOWAAD 600S (manufactured by Kyowa Chemical Industry Co., Ltd.) was added thereto, and the mixture was stirred at a pressure of 4.0 kPa and 80° C. for 1 hour, and then filtered in vacuo. The filtrate was heated to a temperature of from 70° C. to 190° C. over 4 hours at a pressure of 0.3 kPa to distill off unreacted dimethyl succinate, to provide a yellow liquid (ester compound A). The amount of the catalyst used is 0.51 mol per 100 mol of the dicarboxylic acid ester. The ester compound obtained had a weight-average molecular weight of 450 and a viscosity at 23° C. of 260 mPa·s.

Production Example 1 of Phosphoric Ester

Tris(ethoxyethoxyethyl)Phosphate

A 1-liter four-neck flask was charged with 600 g (4.47 mol) of diethylene glycol monoethyl ether, and the content was stirred under a reduced pressure (20 kPa), while blowing a dry nitrogen gas at a flow rate of 50 mL per minute. Next, 114 g (0.745 mol) of phosphorus oxychloride was slowly added dropwise while keeping the internal of the reaction system at room temperature (15° C.), and the mixture was then aged at 40° to 60° C. for 5 hours. Thereafter, 149 g of a 16% by weight aqueous sodium hydroxide solution was added thereto to neutralize, and an excess unreacted diethylene glycol monoethyl ether was distilled off in vacuo under the temperature conditions of from 70° to 120° C. Further, the residue was contacted with steam, to provide 367 g of a crude phosphoric 16% by weight aqueous sodium chloride solution to wash the crude phosphoric triester. Thereafter, a lower layer of the separated layers was discarded, and the remaining upper layer was dehydrated at 75° C. under a reduced pressure, and thereafter further filtered to remove a solid content, to provide 266 g of an intended tris(ethoxyethoxyethyl)phosphate (yield: 80%). This tris(ethoxyethoxyethyl)phosphate was a colorless, transparent homogeneous liquid, and was subjected to chlorine ion analysis. As a result, the tris(ethoxyethoxyethyl) phosphate had a chlorine ion content of 10 mg/kg or less.

Next, production examples for finely pulverized crystal nucleating agent compositions are shown. In addition, the average particle sizes of the crystal nucleating agent compositions obtained in the following Production Examples are shown in Tables 1 to 9.

Production Example 1 of Crystal Nucleating Agent Composition

Seven-hundred and twenty grams of the carboxylic acid ester [(MeEO$_3$)$_2$SA] obtained in Production Example 1 of Carboxylic Acid Ester and 36 g of a zinc salt of an unsubstituted phenylphosphonic acid (manufactured by NISSAN CHEMICAL INDUSTRIES, LTD.: "ECOPROMOTE") were supplied into a media pulverizer (manufactured by Igarashi Kikai Seizo, "Sand Grinder TSG-6H": pulverizer volume: 800 mL, filled with 720 g of zirconia beads having sizes of 1 mmϕ, filling ratio: 30%, agitation blade diameter: 70 mm). While allowing to flow cold water through a jacket of the pulverizer, the mixture was subjected to a pulverization treatment at a rotational speed of 2,000 r/min (agitation peripheral speed: 7 m/s) for 9 hours, to provide a crystal nucleating agent-1 (finely pulverized zinc salt of phenylphosphonic acid). The temperature during the operation was in the range of from 10° to 90° C.

Production Example 2 of Crystal Nucleating Agent Composition

The same procedures as in Production Example 1 were carried out except that the kinds of a carboxylic acid ester was changed to "DAIFATTY-101" (manufactured by DAIHACHI CHEMICAL INDUSTRY CO., LTD., diester formed between adipic acid and a 1/1 mixture of diethylene glycol monomethyl ether and benzyl alcohol), to provide a crystal nucleating agent-2 (finely pulverized zinc salt of phenylphosphonic acid).

Production Example 3 of Crystal Nucleating Agent Composition

The same procedures as in Production Example 2 were carried out except that the amount of the carboxylic acid ester [$(MeEO_3)_2SA$] supplied was changed to 360 g, and at the same time 360 g of "DAIFATTY-101" was supplied, to provide a crystal nucleating agent-3 (finely pulverized zinc salt of phenylphosphonic acid).

Production Example 4 of Crystal Nucleating Agent Composition

The same procedures as in Production Example 1 were carried out except that the amount of the zinc salt of an unsubstituted phenylphosphonic acid supplied was changed to 72 g, to provide a crystal nucleating agent-4 (finely pulverized zinc salt of phenylphosphonic acid).

Production Example 5 of Crystal Nucleating Agent Composition

The same procedures as in Production Example 1 were carried out except that the amount of the zinc salt of an unsubstituted phenylphosphonic acid supplied was changed to 144 g, to provide a crystal nucleating agent-5 (finely pulverized zinc salt of phenylphosphonic acid).

Production Example 6 of Crystal Nucleating Agent Composition

The same procedures as in Production Example 1 were carried out except that the amount of the zinc salt of an unsubstituted phenylphosphonic acid supplied was changed to 216 g, to provide a crystal nucleating agent-6 (finely pulverized zinc salt of phenylphosphonic acid).

Production Example 7 of Crystal Nucleating Agent Composition

The same procedures as in Production Example 1 were carried out except that the amount of the zinc salt of an unsubstituted phenylphosphonic acid supplied was changed to 18 g, to provide a crystal nucleating agent-7 (finely pulverized zinc salt of phenylphosphonic acid).

Production Example 8 of Crystal Nucleating Agent Composition

The same procedures as in Production Example 1 were carried out except that the kind of the carboxylic acid ester was changed from $(MeEO_3)_2SA$ to a triester compound formed between acetic acid and ethylene oxide adduct of glycerol added with 6 mol of ethylene oxide obtained in Production Example 2 of Carboxylic Acid Ester [$(AcEO_6)_3Gly$], to provide a crystal nucleating agent-8 (finely pulverized zinc salt of phenylphosphonic acid).

Production Example 9 of Crystal Nucleating Agent Composition

The same procedures as in Production Example 1 were carried out except that the kind of the carboxylic acid ester was changed from $(MeEO_3)_2SA$ to a polyester-polyol obtained in Production Example 3 of Carboxylic Acid Ester, to provide a crystal nucleating agent-9 (finely pulverized zinc salt of phenylphosphonic acid).

Production Example 10 of Crystal Nucleating Agent Composition

The same procedures as in Production Example 1 were carried out except that the kind of the carboxylic acid ester was changed from $(MeEO_3)_2SA$ to a polyester-polyol obtained in Production Example 3 of Carboxylic Acid Ester, and that 36 g of the zinc salt of an unsubstituted phenylphosphonic acid was changed to 720 g of talc (manufactured by Nippon Talc, "MICRO ACE P-6," to provide a crystal nucleating agent-10.

Production Example 11 of Crystal Nucleating Agent Composition

The same procedures as in Production Example 1 were carried out except that the kind of the carboxylic acid ester was changed from $(MeEO_3)_2SA$ to a triester compound formed between 1,3,6-hexanetricarboxylic acid and triethylene glycol monomethyl ether obtained in Production Example 4 of Carboxylic Acid Ester [$(MeEO_3)_3HTC$], to provide a crystal nucleating agent-11.

Production Example 12 of Crystal Nucleating Agent Composition

Fifty grams of a zinc salt of an unsubstituted phenylphosphonic acid (manufactured by NISSAN CHEMICAL INDUSTRIES, LTD.: "ECOPROMOTE") was supplied into a vibration mill ("MB-1" manufactured by CHUO KAKOHKI CO., LTD, entire vessel volume 3.5 L), and the vibration mill was filled with 11 rods (cross-sectional shape: circular, diameter: 30 mm, length: 218 mm, material: stainless) (filling ratio 48%), and the content was subjected to a treatment at an amplitude of 8 mm and a rotational speed of 1,200 r/min for 60 minutes, to provide a crystal nucleating agent-12.

Production Examples 13 to 47 of Crystal Nucleating Agent Compositions

With reference to Production Example 1, crystal nucleating agents-13 to –47 were obtained with the apparatus and under the conditions as shown in Tables 3 to 10, using the kinds and the amounts of the crystal nucleating agents and the pulverization aid esters used in the step (1) shown in Tables 3 to 10.

Here, the raw materials in Tables 1 to 10 are as follows.
<Crystal Nucleating Agents>
(Organic Crystal Nucleating Agent (a))
PY109: a compound having an isoindolinone backbone (manufactured by Ciba Fine Chemical Co., Ltd., IRGAZIN Yellow 2GLTE)
PY110: a compound having an isoindolinone backbone (manufactured by Ciba Fine Chemical Co., Ltd., CROMOPHTAL Yellow 2RLP)
PR272: a compound having a diketo-pyrrolo-pyrrole backbone (manufactured by Ciba Fine Chemical Co., Ltd., CROMOPHTAL DPP Flame Red FP)
PR254(1): a compound having a diketo-pyrrolo-pyrrole backbone (manufactured by Ciba Fine Chemical Co., Ltd., CROMOPHTAL DPP Red RP)
PR254(2): a compound having a diketo-pyrrolo-pyrrole backbone (manufactured by Ciba Fine Chemical Co., Ltd., IRGAZIN DPP Red BTR)
PV32: a compound having a benzimidazolone backbone (manufactured by Clariant Japan, Graphtol Bordeaux HF3R)
PR185: a compound having a benzimidazolone backbone (manufactured by Clariant Japan, Graphtol Cermine HF4C)
PR208: a compound having a benzimidazolone backbone (manufactured by Clariant Japan, Graphtol Red HF2B)
PB15:3: a compound having a phthalocyanine backbone (manufactured by Ciba Fine Chemical Co., Ltd., IRGALITE Blue GBP)
PB15: a compound having a phthalocyanine backbone (manufactured by Ciba Fine Chemical Co., Ltd., IRGALITE Blue BLPO)
PB15:6: a compound having a phthalocyanine backbone (manufactured by DAINIPPON INK AND CHEMICALS, INCORPORATED, FASTROGEN Blue EP-7)
Vat Blue1: a compound having an indigo backbone (manufactured by KANTO CHEMICAL CO., INC.)
(Organic Crystal Nucleating Agent (b))
T-1287: decamethylenedicarbonyldibenzoyl hydrazide (manufactured by ADEKA)
XyStUre: xylenebis stearylurea (manufactured by Nippon Kasei Chemical Co., Ltd., Hakreen SX)
6-MeUra: 6-methylurasil (manufactured by Wako Pure Chemical Industries, Ltd.)
MC-6000: melamine cyanurate (manufactured by NISSAN CHEMICAL INDUSTRIES, LTD.)
(Organic Crystal Nucleating Agent (c))
PPA-Zn: a zinc salt of an unsubstituted phenylphosphonic acid (manufactured by NISSAN CHEMICAL INDUSTRIES, LTD.: "ECOPROMOTE")
SIP2MeBa: barium di(dimethyl 5-sulfoisophthalate) obtained in Production Example 1 for Organic Crystal Nucleating Agent mentioned above
NA-21: a sodium salt of phosphoric ester (manufactured by ADEKA, ADK STAB NA-21
KM-1500: a magnesium salt of rosin acid (manufactured by Arakawa Chemical Industries, Ltd., PINECRYSTAL KM-1500)
BTTCHA: tricyclohexyl 1,3,5-benzenetricarboxylic acid amide (manufactured by New Japan Chemical Co., Ltd., NJSTAR TF-1)
XBRA: p-xylylenebis rosin acid amide produced in Production Example 2 for Organic Crystal Nucleating Agent mentioned above
(Other Crystal Nucleating Agent)
Talc: MICRO ACE P-6 (manufactured by Nippon Talc, no melting point)
<Pulverization Aid Esters>
$(MeEO_3)_2SA$: a diester compound formed between succinic acid and triethylene glycol monomethyl ether produced in Production Example 1 of Carboxylic Acid Ester mentioned above (weight-average molecular weight: 410, viscosity: 27 mPa·s)
DAIFATTY-101: a diester formed between adipic acid and a 1/1 mixture of diethylene glycol monomethyl ether/benzyl alcohol (manufactured by DAIHACHI CHEMICAL INDUSTRY CO., LTD., weight-average molecular weight: 338, viscosity: 19 mPa·s)
$(AcEO_6)_3Gly$: a triester compound formed between acetic acid and ethylene oxide adduct of glycerol added with 6 mol of ethylene oxide produced in Production Example 2 of Carboxylic Acid Ester mentioned above (weight-average molecular weight: 490, viscosity: 79 mPa·s)
Polyester-Polyol: a polyester-polyol produced in Production Example 3 of Carboxylic Acid Ester mentioned above (weight-average molecular weight: 2,200, viscosity: 21,000 mPa·s)
$(MeEO_3)_3HTC$: a triester formed between 1,3,6-hexanetricarboxylic acid and triethylene glycol monomethyl ether produced in Production Example 4 of Carboxylic Acid Ester mentioned above (weight-average molecular weight: 656, viscosity: 40 mPa·s)
TEP-2: tris(ethoxyethoxyethyl)phosphate produced in Production Example 1 of Phosphoric Ester mentioned above (weight-average molecular weight: 446, viscosity: 13 mPa·s)
MeSA-DEG: a diester formed between dimethyl succinate and diethylene glycol produced in Production Example 5 of Carboxylic Acid Ester mentioned above (weight-average molecular weight: 450, viscosity: 260 mPa·s)

TABLE 1

| Pulverizing Step (step (1)) | | | Prod. Ex. 1 Crystal Nucleating Agent-1 | Prod. Ex. 2 Crystal Nucleating Agent-2 | Prod. Ex. 3 Crystal Nucleating Agent-3 | Prod. Ex. 4 Crystal Nucleating Agent-4 | Prod. Ex. 5 Crystal Nucleating Agent-5 | Prod. Ex. 6 Crystal Nucleating Agent-6 |
|---|---|---|---|---|---|---|---|---|
| Crystal Nucleating Agent | Kind | | PPA-Zn | PPA-Zn | PPA-Zn | PPA-Zn | PPA-Zn | PPA-Zn |
| | Particle Size[1] | $D_{50}$ (nm) | 1090 | 1090 | 1090 | 1090 | 1090 | 1090 |
| | | $D_{90}$ (nm) | 1350 | 1350 | 1350 | 1350 | 1350 | 1350 |
| | | $D_{10}$ (nm) | 880 | 880 | 880 | 880 | 880 | 880 |
| | Amount (g) | | 36 | 36 | 36 | 72 | 144 | 216 |
| Pulverization Aid Ester | Kind | | $(MeEO_3)_2SA$ | DAIFATTY-101 | $(MeEO_3)_2SA$/ DAIFATTY-101 | $(MeEO_3)_2SA$ | $(MeEO_3)_2SA$ | $(MeEO_3)_2SA$ |
| | Weight-Average Molecular Weight[2] | | 410 | 338 | 374 | 410 | 410 | 410 |
| | Viscosity (23° C., mPa · s)[3] | | 27 | 19 | 23 | 27 | 27 | 27 |
| | Amount (g) | | 720 | 720 | 360/360 | 720 | 720 | 720 |

TABLE 1-continued

|  |  | Prod. Ex. 1 Crystal Nucleating Agent-1 | Prod. Ex. 2 Crystal Nucleating Agent-2 | Prod. Ex. 3 Crystal Nucleating Agent-3 | Prod. Ex. 4 Crystal Nucleating Agent-4 | Prod. Ex. 5 Crystal Nucleating Agent-5 | Prod. Ex. 6 Crystal Nucleating Agent-6 |
|---|---|---|---|---|---|---|---|
| Crystal Nucleating Agent/Pulverization Aid Ester[4] | | 1/20 | 1/20 | 1/20 | 1/10 | 1/5 | 3/10 |
| Pulverization Conditions | Kind of Pulverizer | Sand Grinder | Sand Grinder | Sand Grinder | Sand Grinder | Sand Grinder | Sand Grinder |
|  | Material of Media | Zirconia | Zirconia | Zirconia | Zirconia | Zirconia | Zirconia |
|  | Shape of Media (φ: Outer Diameter) | 1 mm beads | 1 mm beads | 1 mm beads | 1 mm beads | 1 mm beads | 1 mm beads |
|  | Rotational Speed (r/min) | 2000 | 2000 | 2000 | 2000 | 2000 | 2000 |
|  | Treatment Time (hours) | 9 | 9 | 9 | 9 | 9 | 9 |
| Physical Properties of Crystal Nucleating Agent after Pulverizing Step (Particle Size)[5] | $D_{50}$ (nm) | 490 | 590 | 535 | 530 | 561 | 598 |
|  | $D_{90}$ (nm) | 716 | 801 | 780 | 761 | 810 | 830 |
|  | $D_{10}$ (nm) | 312 | 380 | 354 | 339 | 364 | 399 |
|  | $D_{10}/D_{50}$ | 0.6 | 0.6 | 0.7 | 0.6 | 0.6 | 0.7 |
|  | $D_{90}/D_{50}$ | 1.5 | 1.4 | 1.5 | 1.4 | 1.4 | 1.4 |

[1] Particle size of a crystal nucleating agent to be subjected to the pulverizing step, wherein $D_{50}$ is a volume-median particle size, $D_{90}$ is a particle size at a cumulative volume frequency of 90%, and $D_{10}$ is a particle size at a cumulative volume frequency of 10%.
[2] Weight-average molecular weight of a pulverization aid ester, and is a weighted average when plural kinds are used.
[3] Viscosity of the pulverization aid ester, and is a weighted average when plural kinds are used.
[4] Ratio of the weight of the crystal nucleating agent to a total weight of the pulverization aid esters, i.e. crystal nucleating agent/pulverization aid esters.
[5] Particle size of a crystal nucleating agent after the pulverizing step, wherein $D_{50}$ is a volume-median particle size, $D_{90}$ is a particle size at a cumulative volume frequency of 90%, $D_{10}$ is a particle size at a cumulative volume frequency of 10%, and $D_{10}/D_{50}$ is a ratio of $D_{10}$ to $D_{50}$, and $D_{90}/D_{50}$ is a ratio of $D_{90}$ to $D_{50}$.

TABLE 2

|  |  |  | Prod. Ex. 7 Crystal Nucleating Agent-7 | Prod. Ex. 8 Crystal Nucleating Agent-8 | Prod. Ex. 9 Crystal Nucleating Agent-9 | Prod. Ex. 10 Crystal Nucleating Agent-10 | Prod. Ex. 11 Crystal Nucleating Agent-11 | Prod. Ex. 12 Crystal Nucleating Agent-12 |
|---|---|---|---|---|---|---|---|---|
| Crystal Nucleating Agent | Kind | | PPA-Zn | PPA-Zn | PPA-Zn | Talc | PPA-Zn | PPA-Zn |
|  | Particle Size[1] | $D_{50}$ (nm) | 1090 | 1090 | 1090 | 3240 | 1090 | 1090 |
|  |  | $D_{90}$ (nm) | 1350 | 1350 | 1350 | 4210 | 1350 | 1350 |
|  |  | $D_{10}$ (nm) | 880 | 880 | 880 | 6230 | 880 | 880 |
|  | Amount (g) | | 18 | 36 | 36 | 720 | 36 | 50 |
| Pulverization Aid Ester | Kind | | (MeEO$_3$)$_2$SA | (AcEO$_6$)$_3$Gly | Polyester-Polyol | Polyester-Polyol | (MeEO$_3$)$_3$HTC | — |
|  | Weight-Average Molecular Weight[2] | | 410 | 490 | 2200 | 2200 | 656 | — |
|  | Viscosity (23° C., mPa·s)[3] | | 27 | 79 | 21000 | 21000 | 40 | — |
|  | Amount (g) | | 720 | 720 | 720 | 720 | 720 | — |
| Crystal Nucleating Agent/Pulverization Aid Ester[4] | | | 1/40 | 1/20 | 1/20 | 1/1 | 1/20 | — |
| Pulverization Conditions | Kind of Pulverizer | | Sand Grinder | Sand Grinder | Sand Grinder | Sand Grinder | Sand Grinder | Vibration Mill |
|  | Material of Media | | Zirconia | Zirconia | Zirconia | Zirconia | Zirconia | Stainless Steel |
|  | Shape of Media (φ: Outer Diameter) | | 1 mm beads | 1 mm beads | 1 mm beads | 1 mm beads | 1 mm beads | 30 mm rod |
|  | Rotational Speed (r/min) | | 2000 | 2000 | 2000 | 2000 | 2000 | 1200 |
|  | Treatment Time (hours) | | 9 | 9 | 9 | 9 | 9 | 1 |
| Physical Properties of Crystal Nucleating Agent after Pulverizing Step (Particle Size)[5] | $D_{50}$ (nm) | | 479 | 650 | ND | ND | 1010 | 1290 |
|  | $D_{90}$ (nm) | | 709 | 920 | ND | ND | 1320 | 1830 |
|  | $D_{10}$ (nm) | | 308 | 452 | ND | ND | 860 | 807 |
|  | $D_{10}/D_{50}$ | | 0.6 | 0.7 | ND | ND | 0.9 | 0.6 |
|  | $D_{90}/D_{50}$ | | 1.5 | 1.4 | ND | ND | 1.3 | 1.4 |

[1] Particle size of a crystal nucleating agent to be subjected to the pulverizing step, wherein $D_{50}$ is a volume-median particle size, $D_{90}$ is a particle size at a cumulative volume frequency of 90%, and $D_{10}$ is a particle size at a cumulative volume frequency of 10%.
[2] Weight-average molecular weight of a pulverization aid ester, and is a weighted average when plural kinds are used.
[3] Viscosity of the pulverization aid ester, and is a weighted average when plural kinds are used.
[4] Ratio of the weight of the crystal nucleating agent to a total weight of the pulverization aid esters, i.e. crystal nucleating agent/pulverization aid esters.
[5] Particle size of a crystal nucleating agent after the pulverizing step, wherein $D_{50}$ is a volume-median particle size, $D_{90}$ is a particle size at a cumulative volume frequency of 90%, $D_{10}$ is a particle size at a cumulative volume frequency of 10%, and $D_{10}/D_{50}$ is a ratio of $D_{10}$ to $D_{90}$ and $D_{90}/D_{50}$ is a ratio of $D_{90}$ to $D_{50}$.
ND: not determined

TABLE 3

|  |  |  | Prod. Ex. 13 Crystal Nucleating Agent-13 | Prod. Ex. 14 Crystal Nucleating Agent-14 |
|---|---|---|---|---|
| Crystal Nucleating Agent | Kind | | PPA-Zn | PPA-Zn |
|  | Particle Size[1] | $D_{50}$ (nm) | 1090 | 1090 |
|  |  | $D_{90}$ (nm) | 1350 | 1350 |
|  |  | $D_{10}$ (nm) | 880 | 880 |
|  | Amount (g) | | 36 | 36 |
| Pulverization Aid Ester | Kind | | TEP-2 | MeSA-DEG |
|  | Weight-Average Molecular Weight[2] | | 446 | 450 |
|  | Viscosity (23° C., mPa·s)[3] | | 13 | 260 |
|  | Amount (g) | | 720 | 720 |
| Crystal Nucleating Agent/Pulverization Aid Ester[4] | | | 1/20 | 1/20 |
| Pulverization | Kind of Pulverizer | | Sand Grinder | Sand Grinder |

TABLE 3-continued

|  |  | Prod. Ex. 13 Crystal Nucleating Agent-13 | Prod. Ex. 14 Crystal Nucleating Agent-14 |
|---|---|---|---|
| Pulverizing Step (step (1)) | | | |
| Conditions | Material of Media | Zirconia | Zirconia |
| | Shape of Media (φ: Outer Diameter) | 1 mm beads | 1 mm beads |
| | Rotational Speed (r/min) | 2000 | 2000 |
| | Treatment Time (hours) | 9 | 9 |
| Physical Properties of Crystal Nucleating Agent after Pulverizing Step | $D_{50}$ (nm) | 525 | 623 |
| | $D_{90}$ (nm) | 752 | 903 |
| | $D_{10}$ (nm) | 341 | 423 |
| (Particle Size)[5] | $D_{10}/D_{50}$ | 0.6 | 0.7 |
| | $D_{90}/D_{50}$ | 1.4 | 1.4 |

[1] Particle size of a crystal nucleating agent to be subjected to the pulverizing step, wherein $D_{50}$ is a volume-median particle size, $D_{90}$ is a particle size at a cumulative volume frequency of 90%, and $D_{10}$ is a particle size at a cumulative volume frequency of 10%.
[2] Weight-average molecular weight of a pulverization aid ester, and is a weighted average when plural kinds are used.
[3] Viscosity of the pulverization aid ester, and is a weighted average when plural kinds are used.
[4] Ratio of the weight of the crystal nucleating agent to a total weight of the pulverization aid esters, i.e. crystal nucleating agent/pulverization aid esters.
[5] Particle size of a crystal nucleating agent after the pulverizing step, wherein $D_{50}$ is a volume-median particle size, $D_{90}$ is a particle size at a cumulative volume frequency of 90%, $D_{10}$ is a particle size at a cumulative volume frequency of 10%, and $D_{10}/D_{50}$ is a ratio of $D_{10}$ to $D_{50}$, and $D_{90}/D_{50}$ is a ratio of $D_{90}$ to $D_{50}$.

TABLE 4

|  |  |  | Prod. Ex. 15 Crystal Nucleating Agent-15 | Prod. Ex. 16 Crystal Nucleating Agent-16 | Prod. Ex. 17 Crystal Nucleating Agent-17 | Prod. Ex. 18 Crystal Nucleating Agent-18 | Prod. Ex. 19 Crystal Nucleating Agent-19 | Prod. Ex. 20 Crystal Nucleating Agent-20 |
|---|---|---|---|---|---|---|---|---|
| Pulverizing Step (step (1)) | | | | | | | | |
| Crystal Nucleating Agent | Kind | | PY109 | PY109 | PY109 | PY109 | PY109 | PY109 |
| | Particle Size[1] | $D_{50}$ (nm) | 1130 | 1130 | 1130 | 1130 | 1130 | 1130 |
| | | $D_{90}$ (nm) | 2122 | 2122 | 2122 | 2122 | 2122 | 2122 |
| | | $D_{10}$ (nm) | 654 | 654 | 654 | 654 | 654 | 654 |
| | Amount (g) | | 36 | 36 | 36 | 36 | 36 | 36 |
| Pulverization Aid Ester | Kind | | (MeEO₃)₂SA | DAIFATTY-101 | (MeEO₃)₂SA/ DAIFATTY-101 | (AcEO₆)₃Gly | TEP-2 | MeSA-DEG |
| | Weight-Average Molecular Weight[2] | | 410 | 338 | 374 | 490 | 446 | 450 |
| | Viscosity (23° C., mPa·s)[3] | | 27 | 19 | 23 | 79 | 13 | 260 |
| | Amount (g) | | 720 | 720 | 360/360 | 720 | 720 | 720 |
| Crystal Nucleating Agent/Pulverization Aid Ester[4] | | | 1/20 | 1/20 | 1/20 | 1/20 | 1/20 | 1/20 |
| Pulverization Conditions | Kind of Pulverizer | | Sand Grinder | Sand Grinder | Sand Grinder | Sand Grinder | Sand Grinder | Sand Grinder |
| | Material of Media | | Zirconia | Zirconia | Zirconia | Zirconia | Zirconia | Zirconia |
| | Shape of Media (φ: Outer Diameter) | | 1 mm beads | 1 mm beads | 1 mm beads | 1 mm beads | 1 mm beads | 1 mm beads |
| | Rotational Speed (r/min) | | 2000 | 2000 | 2000 | 2000 | 2000 | 2000 |
| | Treatment Time (hours) | | 9 | 9 | 9 | 9 | 9 | 9 |
| Physical Properties of Crystal Nucleating Agent after Pulverizing Step (Particle Size)[5] | | $D_{50}$ (nm) | 394 | 490 | 443 | 554 | 424 | 434 |
| | | $D_{90}$ (nm) | 602 | 732 | 750 | 760 | 632 | 642 |
| | | $D_{10}$ (nm) | 230 | 335 | 287 | 390 | 260 | 270 |
| | | $D_{10}/D_{50}$ | 0.6 | 0.7 | 0.6 | 0.7 | 0.6 | 0.6 |
| | | $D_{90}/D_{50}$ | 1.5 | 1.5 | 1.7 | 1.4 | 1.5 | 1.5 |

[1] Particle size of a crystal nucleating agent to be subjected to the pulverizing step, wherein $D_{50}$ is a volume-median particle size, $D_{90}$ is a particle size at a cumulative volume frequency of 90%, and $D_{10}$ is a particle size at a cumulative volume frequency of 10%.
[2] Weight-average molecular weight of a pulverization aid ester, and is a weighted average when plural kinds are used.
[3] Viscosity of the pulverization aid ester, and is a weighted average when plural kinds are used.
[4] Ratio of the weight of the crystal nucleating agent to a total weight of the pulverization aid esters, i.e. crystal nucleating agent/pulverization aid esters.
[5] Particle size of a crystal nucleating agent after the pulverizing step, wherein $D_{50}$ is a volume-median particle size, $D_{90}$ is a particle size at a cumulative volume frequency of 90%, $D_{10}$ is a particle size at a cumulative volume frequency of 10%, and $D_{10}/D_{50}$ is a ratio of $D_{10}$ to $D_{50}$, and $D_{90}/D_{50}$ is a ratio of $D_{90}$ to $D_{50}$.

TABLE 5

|  |  |  | Prod. Ex. 21 Crystal Nucleating Agent-21 | Prod. Ex. 22 Crystal Nucleating Agent-22 | Prod. Ex. 23 Crystal Nucleating Agent-23 | Prod. Ex. 24 Crystal Nucleating Agent-24 |
|---|---|---|---|---|---|---|
| Pulverizing Step (step (1)) | | | | | | |
| Crystal Nucleating Agent | Kind | | PY109 | PY109 | PY109 | PY109 |
| | Particle Size[1] | $D_{50}$ (nm) | 1130 | 1130 | 1130 | 1130 |
| | | $D_{90}$ (nm) | 2122 | 2122 | 2122 | 2122 |
| | | $D_{10}$ (nm) | 654 | 654 | 654 | 654 |
| | Amount (g) | | 72 | 144 | 216 | 18 |
| Pulverization Aid Ester | Kind | | (MeEO₃)₂SA | (MeEO₃)₂SA | (MeEO₃)₂SA | (MeEO₃)₂SA |
| | Weight-Average Molecular Weight[2] | | 410 | 410 | 410 | 410 |
| | Viscosity (23° C., mPa·s)[3] | | 27 | 27 | 27 | 27 |
| | Amount (g) | | 720 | 720 | 720 | 720 |
| Crystal Nucleating Agent/Pulverization Aid Ester[4] | | | 1/10 | 1/5 | 3/10 | 1/40 |
| Pulverization Conditions | Kind of Pulverizer | | Sand Grinder | Sand Grinder | Sand Grinder | Sand Grinder |
| | Material of Media | | Zirconia | Zirconia | Zirconia | Zirconia |
| | Shape of Media (φ: Outer Diameter) | | 1 mm beads | 1 mm beads | 1 mm beads | 1 mm beads |

TABLE 5-continued

|  |  | Prod. Ex. 21 Crystal Nucleating Agent-21 | Prod. Ex. 22 Crystal Nucleating Agent-22 | Prod. Ex. 23 Crystal Nucleating Agent-23 | Prod. Ex. 24 Crystal Nucleating Agent-24 |
|---|---|---|---|---|---|
| Pulverizing Step (step (1)) | | | | | |
| | Rotational Speed (r/min) | 2000 | 2000 | 2000 | 2000 |
| | Treatment Time (hours) | 9 | 9 | 9 | 9 |
| Physical Properties of Crystal Nucleating Agent after Pulverizing Step (Particle Size)[5] | $D_{50}$ (nm) | 634 | 670 | 678 | 580 |
| | $D_{90}$ (nm) | 1045 | 1089 | 1143 | 980 |
| | $D_{10}$ (nm) | 376 | 401 | 430 | 310 |
| | $D_{10}/D_{50}$ | 0.6 | 0.6 | 0.6 | 0.5 |
| | $D_{90}/D_{50}$ | 1.6 | 1.6 | 1.7 | 1.7 |

[1] Particle size of a crystal nucleating agent to be subjected to the pulverizing step, wherein $D_{50}$ is a volume-median particle size, $D_{90}$ is a particle size at a cumulative volume frequency of 90%, and $D_{10}$ is a particle size at a cumulative volume frequency of 10%.
[2] Weight-average molecular weight of a pulverization aid ester, and is a weighted average when plural kinds are used.
[3] Viscosity of the pulverization aid ester, and is a weighted average when plural kinds are used.
[4] Ratio of the weight of the crystal nucleating agent to a total weight of the pulverization aid esters, i.e. crystal nucleating agent/pulverization aid esters.
[5] Particle size of a crystal nucleating agent after the pulverizing step, wherein $D_{50}$ is a volume-median particle size, $D_{90}$ is a particle size at a cumulative volume frequency of 90%, $D_{10}$ is a particle size at a cumulative volume frequency of 10%, and $D_{10}/D_{50}$ is a ratio of $D_{10}$ to $D_{50}$, and $D_{90}/D_{50}$ is a ratio of $D_{90}$ to $D_{50}$.

TABLE 6

|  |  |  | Prod. Ex. 25 Crystal Nucleating Agent-25 | Prod. Ex. 26 Crystal Nucleating Agent-26 | Prod. Ex. 27 Crystal Nucleating Agent-27 | Prod. Ex. 28 Crystal Nucleating Agent-28 | Prod. Ex. 29 Crystal Nucleating Agent-29 | Prod. Ex. 30 Crystal Nucleating Agent-30 |
|---|---|---|---|---|---|---|---|---|
| Pulverizing Step (step (1)) | | | | | | | | |
| Crystal Nucleating Agent | Kind | | PY110 | PR272 | PR254(1) | PR254(2) | PV32 | PR185 |
| | Particle Size[1] | $D_{50}$ (nm) | 811 | 1345 | 1201 | 756 | 1091 | 1233 |
| | | $D_{90}$ (nm) | 1156 | 1820 | 2155 | 1365 | 2071 | 2356 |
| | | $D_{10}$ (nm) | 526 | 960 | 865 | 529 | 792 | 798 |
| | Amount (g) | | 36 | 36 | 36 | 36 | 36 | 36 |
| Pulverization Aid Ester | Kind | | (MeEO$_3$)$_2$SA | (MeEO$_3$)$_2$SA | (MeEO$_3$)$_2$SA | (MeEO$_3$)$_2$SA | (MeEO$_3$)$_2$SA | (MeEO$_3$)$_2$SA |
| | Weight-Average Molecular Weight[2] | | 410 | 410 | 410 | 410 | 410 | 410 |
| | Viscosity (23° C., mPa·s)[3] | | 27 | 27 | 27 | 27 | 27 | 27 |
| | Amount (g) | | 720 | 720 | 720 | 720 | 720 | 720 |
| Crystal Nucleating Agent/Pulverization Aid Ester[4] | | | 1/20 | 1/20 | 1/20 | 1/20 | 1/20 | 1/20 |
| Pulverization Conditions | Kind of Pulverizer | | Sand Grinder | Sand Grinder | Sand Grinder | Sand Grinder | Sand Grinder | Sand Grinder |
| | Material of Media | | Zirconia | Zirconia | Zirconia | Zirconia | Zirconia | Zirconia |
| | Shape of Media (φ: Outer Diameter) | | 1 mm beads | 1 mm beads | 1 mm beads | 1 mm beads | 1 mm beads | 1 mm beads |
| | Rotational Speed (r/min) | | 2000 | 2000 | 2000 | 2000 | 2000 | 2000 |
| | Treatment Time (hours) | | 9 | 9 | 9 | 9 | 9 | 9 |
| Physical Properties of Crystal Nucleating Agent after Pulverizing Step (Particle Size)[5] | $D_{50}$ (nm) | | 356 | 672 | 616 | 396 | 534 | 630 |
| | $D_{90}$ (nm) | | 578 | 1120 | 964 | 672 | 820 | 994 |
| | $D_{10}$ (nm) | | 209 | 492 | 440 | 264 | 396 | 396 |
| | $D_{10}/D_{50}$ | | 0.6 | 0.7 | 0.7 | 0.7 | 0.7 | 0.6 |
| | $D_{90}/D_{50}$ | | 1.6 | 1.7 | 1.6 | 1.7 | 1.5 | 1.6 |

[1] Particle size of a crystal nucleating agent to be subjected to the pulverizing step, wherein $D_{50}$ is a volume-median particle size, $D_{90}$ is a particle size at a cumulative volume frequency of 90%, and $D_{10}$ is a particle size at a cumulative volume frequency of 10%.
[2] Weight-average molecular weight of a pulverization aid ester, and is a weighted average when plural kinds are used.
[3] Viscosity of the pulverization aid ester, and is a weighted average when plural kinds are used.
[4] Ratio of the weight of the crystal nucleating agent to a total weight of the pulverization aid esters, i.e. crystal nucleating agent/pulverization aid esters.
[5] Particle size of a crystal nucleating agent after the pulverizing step, wherein $D_{50}$ is a volume-median particle size, $D_{90}$ is a particle size at a cumulative volume frequency of 90%, $D_{10}$ is a particle size at a cumulative volume frequency of 10%, and $D_{10}/D_{50}$ is a ratio of $D_{10}$ to $D_{50}$, and $D_{90}/D_{50}$ is a ratio of $D_{90}$ to $D_{50}$.

TABLE 7

|  |  |  | Prod. Ex. 31 Crystal Nucleating Agent-31 | Prod. Ex. 32 Crystal Nucleating Agent-32 | Prod. Ex. 33 Crystal Nucleating Agent-33 | Prod. Ex. 34 Crystal Nucleating Agent-34 | Prod. Ex. 35 Crystal Nucleating Agent-35 |
|---|---|---|---|---|---|---|---|
| Pulverizing Step (step (1)) | | | | | | | |
| Crystal Nucleating Agent | Kind | | PR208 | PB15:3 | PB15 | PB15:6 | Vat Blue1 |
| | Particle Size[1] | $D_{50}$ (nm) | 792 | 1221 | 1154 | 1356 | 940 |
| | | $D_{90}$ (nm) | 1654 | 2200 | 2170 | 2321 | 1722 |
| | | $D_{10}$ (nm) | 476 | 801 | 768 | 851 | 561 |
| | Amount (g) | | 36 | 36 | 36 | 36 | 36 |
| Pulverization Aid Ester | Kind | | (MeEO$_3$)$_2$SA | (MeEO$_3$)$_2$SA | (MeEO$_3$)$_2$SA | (MeEO$_3$)$_2$SA | (MeEO$_3$)$_2$SA |
| | Weight-Average Molecular Weight | | 410 | 410 | 410 | 410 | 410 |
| | Viscosity (23° C., mPa·s)[3] | | 27 | 27 | 27 | 27 | 27 |
| | Amount (g) | | 720 | 720 | 720 | 720 | 720 |

TABLE 7-continued

|  |  | Prod. Ex. 31 Crystal Nucleating Agent-31 | Prod. Ex. 32 Crystal Nucleating Agent-32 | Prod. Ex. 33 Crystal Nucleating Agent-33 | Prod. Ex. 34 Crystal Nucleating Agent-34 | Prod. Ex. 35 Crystal Nucleating Agent-35 |
| --- | --- | --- | --- | --- | --- | --- |
| Pulverizing Step (step (1)) | | | | | | |
| Crystal Nucleating Agent/Pulverization Aid Ester[4] | | 1/20 | 1/20 | 1/20 | 1/20 | 1/20 |
| Pulverization Conditions | Kind of Pulverizer | Sand Grinder | Sand Grinder | Sand Grinder | Sand Grinder | Sand Grinder |
| | Material of Media | Zirconia | Zirconia | Zirconia | Zirconia | Zirconia |
| | Shape of Media (φ: Outer Diameter) | 1 mm beads | 1 mm beads | 1 mm beads | 1 mm beads | 1 mm beads |
| | Rotational Speed (r/min) | 2000 | 2000 | 2000 | 2000 | 2000 |
| | Treatment Time (hours) | 9 | 9 | 9 | 9 | 9 |
| Physical Properties of Crystal Nucleating Agent after Pulverizing Step (Particle Size)[5] | $D_{50}$ (nm) | 396 | 612 | 588 | 660 | 468 |
| | $D_{90}$ (nm) | 670 | 898 | 880 | 964 | 840 |
| | $D_{10}$ (nm) | 224 | 402 | 396 | 420 | 270 |
| | $D_{10}/D_{50}$ | 0.6 | 0.7 | 0.7 | 0.6 | 0.6 |
| | $D_{90}/D_{50}$ | 1.7 | 1.5 | 1.5 | 1.5 | 1.8 |

[1] Particle size of a crystal nucleating agent to be subjected to the pulverizing step, wherein $D_{50}$ is a volume-median particle size, $D_{90}$ is a particle size at a cumulative volume frequency of 90%, and $D_{10}$ is a particle size at a cumulative volume frequency of 10%.
[2] Weight-average molecular weight of a pulverization aid ester, and is a weighted average when plural kinds are used.
[3] Viscosity of the pulverization aid ester, and is a weighted average when plural kinds are used.
[4] Ratio of the weight of the crystal nucleating agent to a total weight of the pulverization aid esters, i.e. crystal nucleating agent/pulverization aid esters.
[5] Particle size of a crystal nucleating agent after the pulverizing step, wherein $D_{50}$ is a volume-median particle size, $D_{90}$ is a particle size at a cumulative volume frequency of 90%, $D_{10}$ is a particle size at a cumulative volume frequency of 10%, and $D_{10}/D_{50}$ is a ratio of $D_{10}$ to $D_{50}$, and $D_{90}/D_{50}$ is a ratio of $D_{90}$ to $D_{50}$.

TABLE 8

|  |  |  | Prod. Ex. 36 Crystal Nucleating Agent-36 | Prod. Ex. 37 Crystal Nucleating Agent-37 | Prod. Ex. 38 Crystal Nucleating Agent-38 | Prod. Ex. 39 Crystal Nucleating Agent-39 |
| --- | --- | --- | --- | --- | --- | --- |
| Pulverizing Step (step (1)) | | | | | | |
| Crystal Nucleating Agent | Kind | | T-1287 | XyStUre | 6-MeUra | MC-6000 |
| | Particle Size[1] | $D_{50}$ (nm) | 986 | 990 | 1200 | 1123 |
| | | $D_{90}$ (nm) | 2121 | 2210 | 2107 | 2260 |
| | | $D_{10}$ (nm) | 431 | 458 | 489 | 501 |
| | Amount (g) | | 36 | 36 | 36 | 36 |
| Pulverization Aid Ester | Kind | | (MeEO$_3$)$_2$SA | (MeEO$_3$)$_2$SA | (MeEO$_3$)$_2$SA | (MeEO$_3$)$_2$SA |
| | Weight-Average Molecular Weight[2] | | 410 | 410 | 410 | 410 |
| | Viscosity (23° C., mPa·s)[3] | | 27 | 27 | 27 | 27 |
| | Amount (g) | | 720 | 720 | 720 | 720 |
| Crystal Nucleating Agent/Pulverization Aid Ester[4] | | | 1/20 | 1/20 | 1/20 | 1/20 |
| Pulverization Conditions | Kind of Pulverizer | | Sand Grinder | Sand Grinder | Sand Grinder | Sand Grinder |
| | Material of Media | | Zirconia | Zirconia | Zirconia | Zirconia |
| | Shape of Media (φ: Outer Diameter) | | 1 mm beads | 1 mm beads | 1 mm beads | 1 mm beads |
| | Rotational Speed (r/min) | | 2000 | 2000 | 2000 | 2000 |
| | Treatment Time (hours) | | 9 | 9 | 9 | 9 |
| Physical Properties of Crystal Nucleating Agent after Pulverizing Step (Particle Size)[5] | $D_{50}$ (nm) | | 513 | 523 | 532 | 564 |
| | $D_{90}$ (nm) | | 790 | 809 | 980 | 890 |
| | $D_{10}$ (nm) | | 335 | 345 | 332 | 343 |
| | $D_{10}/D_{50}$ | | 0.7 | 0.7 | 0.6 | 0.6 |
| | $D_{90}/D_{50}$ | | 1.5 | 1.5 | 1.8 | 1.6 |

[1] Particle size of a crystal nucleating agent to be subjected to the pulverizing step, wherein $D_{50}$ is a volume-median particle size, $D_{90}$ is a particle size at a cumulative volume frequency of 90%, and $D_{10}$ is a particle size at a cumulative volume frequency of 10%.
[2] Weight-average molecular weight of a pulverization aid ester, and is a weighted average when plural kinds are used.
[3] Viscosity of the pulverization aid ester, and is a weighted average when plural kinds are used.
[4] Ratio of the weight of the crystal nucleating agent to a total weight of the pulverization aid esters, i.e. crystal nucleating agent/pulverization aid esters.
[5] Particle size of a crystal nucleating agent after the pulverizing step, wherein $D_{50}$ is a volume-median particle size, $D_{90}$ is a particle size at a cumulative volume frequency of 90%, $D_{10}$ is a particle size at a cumulative volume frequency of 10%, and $D_{10}/D_{50}$ is a ratio of $D_{10}$ to $D_{50}$ and $D_{90}/D_{50}$ is a ratio of $D_{90}$ to $D_{50}$.

TABLE 9

|  |  |  | Prod. Ex. 40 Crystal Nucleating Agent-40 | Prod. Ex. 41 Crystal Nucleating Agent-41 | Prod. Ex. 42 Crystal Nucleating Agent-42 | Prod. Ex. 43 Crystal Nucleating Agent-43 | Prod. Ex. 44 Crystal Nucleating Agent-44 |
| --- | --- | --- | --- | --- | --- | --- | --- |
| Pulverizing Step (step (1)) | | | | | | | |
| Crystal Nucleating Agent | Kind | | SIP2MeBa | NA-21 | KM-1500 | BTTCHA | XBRA |
| | Particle Size[1] | $D_{50}$ (nm) | 986 | 990 | 1053 | 1064 | 1066 |
| | | $D_{90}$ (nm) | 2121 | 2125 | 2188 | 2199 | 2201 |
| | | $D_{10}$ (nm) | 431 | 435 | 498 | 509 | 511 |
| | Amount (g) | | 36 | 36 | 36 | 36 | 36 |

TABLE 9-continued

|  |  | Prod. Ex. 40 Crystal Nucleating Agent-40 | Prod. Ex. 41 Crystal Nucleating Agent-41 | Prod. Ex. 42 Crystal Nucleating Agent-42 | Prod. Ex. 43 Crystal Nucleating Agent-43 | Prod. Ex. 44 Crystal Nucleating Agent-44 |
| --- | --- | --- | --- | --- | --- | --- |
| Pulverizing Step (step (1)) | | | | | | |
| Pulverization Aid Ester | Kind | $(MeEO_3)_2SA$ | $(MeEO_3)_2SA$ | $(MeEO_3)_2SA$ | $(MeEO_3)_2SA$ | $(MeEO_3)_2SA$ |
|  | Weight-Average Molecular Weight[2] | 410 | 410 | 410 | 410 | 410 |
|  | Viscosity (23° C., mPa·s)[3] | 27 | 27 | 27 | 27 | 27 |
|  | Amount (g) | 720 | 720 | 720 | 720 | 720 |
| Crystal Nucleating Agent/Pulverization Aid Ester[4] | | 1/20 | 1/20 | 1/20 | 1/20 | 1/20 |
| Pulverization Conditions | Kind of Pulverizer | Sand Grinder | Sand Grinder | Sand Grinder | Sand Grinder | Sand Grinder |
|  | Material of Media | Zirconia | Zirconia | Zirconia | Zirconia | Zirconia |
|  | Shape of Media (φ: Outer Diameter) | 1 mm beads | 1 mm beads | 1 mm beads | 1 mm beads | 1 mm beads |
|  | Rotational Speed (r/min) | 2000 | 2000 | 2000 | 2000 | 2000 |
|  | Treatment Time (hours) | 9 | 9 | 9 | 9 | 9 |
| Physical Properties of Crystal Nucleating Agent after Pulverizing Step (Particle Size)[5] | $D_{50}$ (nm) | 524 | 528 | 592 | 613 | 622 |
|  | $D_{90}$ (nm) | 809 | 950 | 909 | 1009 | 1123 |
|  | $D_{10}$ (nm) | 346 | 350 | 414 | 435 | 444 |
|  | $D_{10}/D_{50}$ | 0.7 | 0.7 | 0.7 | 0.7 | 0.7 |
|  | $D_{90}/D_{50}$ | 1.5 | 1.8 | 1.5 | 1.6 | 1.8 |

[1] Particle size of a crystal nucleating agent to be subjected to the pulverizing step, wherein $D_{50}$ is a volume-median particle size, $D_{90}$ is a particle size at a cumulative volume frequency of 90%, and $D_{10}$ is a particle size at a cumulative volume frequency of 10%.
[2] Weight-average molecular weight of a pulverization aid ester, and is a weighted average when plural kinds are used.
[3] Viscosity of the pulverization aid ester, and is a weighted average when plural kinds are used.
[4] Ratio of the weight of the crystal nucleating agent to a total weight of the pulverization aid esters, i.e. crystal nucleating agent/pulverization aid esters.
[5] Particle size of a crystal nucleating agent after the pulverizing step, wherein $D_{50}$ is a volume-median particle size, $D_{90}$ is a particle size at a cumulative volume frequency of 90%, $D_{10}$ is a particle size at a cumulative volume frequency of 10%, and $D_{10}/D_{50}$ is a ratio of $D_{10}$ to $D_{50}$, and $D_{90}/D_{50}$ is a ratio of $D_{90}$ to $D_{50}$.

TABLE 10

|  |  |  | Prod. Ex. 45 Crystal Nucleating Agent-45 | Prod. Ex. 46 Crystal Nucleating Agent-46 | Prod. Ex. 47 Crystal Nucleating Agent-47 |
| --- | --- | --- | --- | --- | --- |
| Pulverizing Step (step(1)) | | | | | |
| Crystal Nucleating Agent | Kind | | PY109 | PY109 | PY109 |
|  | Particle Size[1] | $D_{50}$ (nm) | 1130 | 1130 | 1130 |
|  |  | $D_{90}$ (nm) | 2122 | 2122 | 2122 |
|  |  | $D_{10}$ (nm) | 654 | 654 | 654 |
|  | Amount (g) | | 36 | 36 | 50 |
| Pulverization Aid Ester | Kind | | Polyester-Polyol | $(MeEO_3)_3HTC$ | — |
|  | Weight-Average Molecular Weight[2] | | 2200 | 656 | — |
|  | Viscosity (23° C., mPa·s)[3] | | 21000 | 40 | — |
|  | Amount (g) | | 720 | 720 | — |
| Crystal Nucleating Agent/Pulverization Aid Ester[4] | | | 1/20 | 1/20 | — |
| Pulverization Conditions | Kind of Pulverizer | | Sand Grinder | Sand Grinder | Vibration Mill |
|  | Material of Media | | Zirconia | Zirconia | Stainless Steel |
|  | Shape of Media ((φ: Outer Diameter) | | 1 mm beads | 1 mm beads | 30 mm rod |
|  | Rotational Speed (r/min) | | 2000 | 2000 | 1200 |
|  | Treatment Time (hours) | | 9 | 9 | 1 |
| Physical Properties of Crystal Nucleating Agent after Pulverizing Step (Particle Size)[5] | $D_{50}$ (nm) | | ND | 1002 | 1345 |
|  | $D_{90}$ (nm) | | ND | 1400 | 1989 |
|  | $D_{10}$ (nm) | | ND | 789 | 806 |
|  | $D_{10}/D_{50}$ | | ND | 0.8 | 0.6 |
|  | $D_{90}/D_{50}$ | | ND | 1.4 | 1.5 |

[1] Particle size of a crystal nucleating agent to be subjected to the pulverizing step, wherein $D_{50}$ is a volume-median particle size, $D_{90}$ is a particle size at a cumulative volume frequency of 90%, and $D_{10}$ is a particle size at a cumulative volume frequency of 10%.
[2] Weight-average molecular weight of a pulverization aid ester, and is a weighted average when plural kinds are used.
[3] Viscosity of the pulverization aid ester, and is a weighted average when plural kinds are used.
[4] Ratio of the weight of the crystal nucleating agent to a total weight of the pulverization aid esters, i.e. crystal nucleating agent/pulverization aid esters.
[5] Particle size of a crystal nucleating agent after the pulverizing step, wherein $D_{50}$ is a volume-median particle size, $D_{90}$ is a particle size at a cumulative volume frequency of 90%, $D_{10}$ is a particle size at a cumulative volume frequency of 10%, and $D_{10}/D_{50}$ is a ratio of $D_{10}$ to $D_{50}$, and $D_{90}/D_{50}$ is a ratio of $D_{90}$ to $D_{50}$.
ND: not determined It can be seen from Tables 1 to 3 that the zinc salt of phenylphosphonic acid is finely pulverized by pulverizing the zinc salt of phenylphosphonic acid in the presence of a carboxylic acid ester or a phosphoric ester, having a specified weight-average molecular weight and a specified viscosity. Incidentally, the crystal nucleating agent composition obtained by pulverizing with a polyester-polyol (Crystal Nucleating Agent-9, -10) had an exceedingly high viscosity, so that the crystal nucleating agent could not be dispersed in ethanol, whereby the particle size could not be determined.

It can be seen from Tables 4 to 10 that various kinds of the organic crystal nucleating agent are finely dispersed by pulverizing the organic nucleating agents in the presence of a carboxylic acid ester or a phosphoric ester, having a specified weight-average molecular weight and a specified viscosity. Incidentally, the crystal nucleating agent composition obtained by pulverizing with a polyester-polyol (Crystal Nucleating Agent-45) had an exceedingly high viscosity, so that the crystal nucleating agent could not be dispersed in ethanol, whereby the particle size could not be determined.

Examples 1 to 49 and Comparative Examples 1 to 36

Raw materials for a polylactic acid resin composition shown in Tables 11 to 18 were melt-kneaded with a twin-screw extruder (PCM-45, manufactured by Ikegai Ironworks Corp.) at a rotational speed of 100 r/min and a kneading temperature of 190° C., the kneaded mixture was strand-cut, to provide pellets of a polylactic acid resin composition. The pellets obtained were dried at 70° C. under a reduced pressure for one day, so as to have a water content of 500 ppm or less.

Here, the raw materials in Tables 11 to 18 are as follows.
<Polylactic Acid Resin>
NW3001D: a polylactic acid resin (manufactured by Nature Works LLC, Nature Works 3001D, optical purity: 98.5%, weight-average molecular weight: 120,000)
<Crystal Nucleating Agent>
Crystal Nucleating Agent-1 to -47: crystal nucleating agent compositions produced in Production Examples 1 to 47 of Crystal Nucleating Agent Compositions mentioned above
PPA-Zn: a zinc salt of unsubstituted phenylphosphonic acid (manufactured by NISSAN CHEMICAL INDUSTRIES, LTD., ECOPROMOTE, no melting point)
OHC18EB: ethylenebis-12-hydroxystearic amide (Nippon Kasei Chemical Co., Ltd., SLIPAX H, melting point: 145° C.)
PY109: a compound having an isoindolinone backbone (manufactured by Ciba Fine Chemical Co., Ltd., IRGAZIN Yellow 2GLTE)
<Plasticizers>
$(MeEO_3)_2SA$: the same one as that used in the production of the crystal nucleating agent composition mentioned above.
DAIFATTY-101: the same one as that used in the production of the crystal nucleating agent composition mentioned above.
$(AcEO_6)_3Gly$: the same one as that used in the production of the crystal nucleating agent composition mentioned above.
Polyester-Polyol: the same one as that used in the production of the crystal nucleating agent composition mentioned above.
$(MeEO_3)_3HTC$: the same one as that used in the production of the crystal nucleating agent composition mentioned above.

Examples 1 to 49 and Comparative Examples 1 to 36

Molded Articles of Polylactic Acid Resin Compositions

Next, the pellets of Examples and Comparative Examples were injection-molded with an injection molding machine (manufactured by The Japan Steel Works, Ltd., J75E-D) of which cylinder temperature was 200° C., into test pieces [flat plates (70 mm×40 mm×2 mm), rectangular test pieces (125 mm×12 mm×6 mm) and rectangular test pieces (63 mm×12 mm×5 mm)] at a die temperature of 80° C., 70° C., or 60° C., to provide molded articles of polylactic acid resin compositions.

Here, upon molding a molded article, a die retention time necessary for demolding the test piece mentioned above was evaluated by the following criteria. These results are shown in Tables 11 to 18.
<Evaluation of Crystallinity (Crystallization Velocity): Evaluation Criteria of Die Retention Time Necessary for Releasing Mold>
A time period in which a test piece could be easily demolded without undergoing deformation at a die temperature shown in Tables 11 to 18 for all three kinds of test pieces is defined as a die retention time necessary for demolding. The shorter the die retention time, the faster the crystallization velocity of the test piece at an internal portion and the runner portion of the die, and the more excellent the moldability. Here, it is judged as "ND" when a test piece could not be demolded, or even if a test piece could be demolded, the deformation was caused.

TABLE 11

| Components of Polylactic Acid Resin Composition | | Examples | | | | | | | | | | | | | | |
|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 |
| Polylactic Acid Resin | NW 3001D | 100 | 100 | 100 | 100 | 100 | 100 | 100 | 100 | 100 | 100 | 100 | 100 | 100 | 100 | 100 |
| Crystal Nucleating Agent | Crystal Nucleating Agent-1 | 10.5 | 10.5 | — | — | — | — | — | — | — | — | — | 21 | — | — | — |
| | Crystal Nucleating Agent-2 | — | — | 10.5 | — | — | — | — | — | — | — | — | — | — | — | — |
| | Crystal Nucleating Agent-3 | — | — | — | 10.5 | — | — | — | — | — | — | — | — | — | — | — |
| | Crystal Nucleating Agent-4 | — | — | — | — | 11.0 | — | — | — | 5.5 | — | — | 22 | — | — | — |
| | Crystal Nucleating Agent-5 | — | — | — | — | — | 12.0 | — | — | — | — | — | — | 18 | — | — |
| | Crystal Nucleating Agent-6 | — | — | — | — | — | — | 13.0 | — | — | — | — | — | — | — | — |
| | Crystal Nucleating Agent-7 | — | — | — | — | — | — | — | 20.5 | — | — | — | — | — | — | — |
| | Crystal Nucleating Agent-8 | — | — | — | — | — | — | — | — | — | 10.5 | — | — | — | — | — |
| | Crystal Nucleating Agent-9 | — | — | — | — | — | — | — | — | — | — | — | — | — | — | — |
| | Crystal Nucleating Agent-10 | — | — | — | — | — | — | — | — | — | — | — | — | — | — | — |
| | Crystal Nucleating Agent-11 | — | — | — | — | — | — | — | — | — | — | — | — | — | — | — |
| | Crystal Nucleating Agent-12 | — | — | — | — | — | — | — | — | — | — | — | — | — | — | — |
| | Crystal Nucleating Agent-13 | — | — | — | — | — | — | — | — | — | — | — | — | — | 10.5 | — |
| | Crystal Nucleating | — | — | — | — | — | — | — | — | — | — | — | — | — | — | 10.5 |

TABLE 11-continued

| Components of Polylactic Acid Resin Composition | | Examples | | | | | | | | | | | | | | |
|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 |
| | Agent-14 | — | — | — | — | — | — | — | — | — | — | — | — | — | — | — |
| | PPA-Zn | — | — | — | — | — | — | — | — | — | — | — | — | — | — | — |
| | OHC18EB | 0.5 | — | — | — | — | — | — | — | — | — | — | — | — | — | — |
| Plasticizer | $(MeEO_3)_2SA$ | — | — | — | — | — | — | — | — | — | — | — | — | — | — | — |
| | DAIFATTY-101 | — | — | — | — | — | — | — | — | — | — | — | — | — | — | — |
| | $(AcEO_6)_3Gly$ | — | — | — | — | — | — | — | — | — | — | — | — | — | — | — |
| | Polyester-Polyol | — | — | — | — | — | — | — | — | — | — | — | — | — | — | — |
| | $(MeEO_3)_3HTC$ | — | — | — | — | — | — | — | — | — | — | — | — | — | — | — |
| Evaluation of Polylactic Acid Resin Composition | Die Retention Time(s) at Die Temperature of 80° C. | 30 | 50 | 60 | 55 | 30 | 20 | 15 | 30 | 70 | 70 | 15 | 15 | 15 | 60 | 55 |
| | Die Retention Time(s) at Die Temperature of 70° C. | 50 | 80 | 90 | 85 | 50 | 30 | 20 | 40 | 90 | 95 | 20 | 18 | 18 | 90 | 85 |
| | Die Retention Time(s) at Die Temperature of 60° C. | 60 | 90 | 110 | 100 | 70 | 40 | 25 | 50 | 120 | 120 | 22 | 20 | 20 | 110 | 100 |

Note)
Content of each of the raw materials is expressed by parts by weight, based on 100 parts by weight of the polylactic acid resin.

TABLE 12

| Components of Polylactic Acid Resin Composition | | Comparative Examples | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| Polylactic Acid Resin | NW 3001D | 100 | 100 | 100 | 100 | 100 | 100 | 100 | 100 | 100 | 100 | 100 | 100 |
| Crystal Nucleating Agent | Crystal Nucleating Agent-1 | — | — | — | — | — | — | — | — | — | — | — | — |
| | Crystal Nucleating Agent-2 | — | — | — | — | — | — | — | — | — | — | — | — |
| | Crystal Nucleating Agent-3 | — | — | — | — | — | — | — | — | — | — | — | — |
| | Crystal Nucleating Agent-4 | — | — | — | — | — | — | — | — | — | — | — | — |
| | Crystal Nucleating Agent-5 | — | — | — | — | — | — | — | — | — | — | — | — |
| | Crystal Nucleating Agent-6 | — | — | — | — | — | — | — | — | — | — | — | — |
| | Crystal Nucleating Agent-7 | — | — | — | — | — | — | — | — | — | — | — | — |
| | Crystal Nucleating Agent-8 | — | — | — | — | — | — | — | — | — | — | — | — |
| | Crystal Nucleating Agent-9 | — | — | — | 10.5 | — | — | — | — | — | — | — | — |
| | Crystal Nucleating Agent-10 | — | — | — | — | 10.0 | — | — | — | — | — | — | — |
| | Crystal Nucleating Agent-11 | — | — | — | — | — | — | — | 10.5 | — | — | — | — |
| | Crystal Nucleating Agent-12 | — | — | — | — | — | — | — | — | 0.5 | — | — | — |
| | PPA-Zn | 0.5 | 0.5 | 0.5 | — | — | 0.5 | — | — | 0.5 | 1.0 | 2.0 | 3.0 |
| | OHC18EB | — | — | — | — | — | — | — | — | — | — | — | — |
| Plasticizer | $(MeEO_3)_2SA$ | 10.0 | — | 5.0 | — | — | — | — | 10.0 | — | 20.0 | 20.0 | 15.0 |
| | DAIFATTY-101 | — | 10.0 | 5.0 | — | — | — | — | — | — | — | — | — |
| | $(AcEO_6)_3Gly$ | — | — | — | — | — | 10.0 | — | — | — | — | — | — |
| | Polyester-Polyol | — | — | — | — | — | — | — | — | — | — | — | — |
| | $(MeEO_3)_3HTC$ | — | — | — | — | — | — | — | — | 10.0 | — | — | — |
| Evaluation of Polylactic Acid Resin Composition | Die Retention Time(s) at Die Temperature of 80° C. | 90 | 100 | 95 | 130 | 150 | 110 | 100 | 100 | 140 | 80 | 80 | 80 |
| | Die Retention Time(s) at Die Temperature of 70° C. | 120 | 130 | 125 | ND | ND | 150 | ND | 130 | ND | 115 | 110 | 110 |

TABLE 12-continued

| Components of Polylactic Acid Resin Composition | | Comparative Examples | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| | Die Retention Time(s) at Die Temperature of 60° C. | ND | ND | ND | ND | ND | ND | ND | ND | ND | ND | ND | ND |

Note)
Content of each of the raw materials is expressed by parts by weight, based on 100 parts by weight of the polylactic acid resin.
ND: not determined

TABLE 13

| Components of Polylactic Acid Resin Composition | | Examples | | | | | | | | | | | | | |
|---|---|---|---|---|---|---|---|---|---|---|---|---|---|---|---|
| | | 16 | 17 | 18 | 19 | 20 | 21 | 22 | 23 | 24 | 25 | 26 | 27 | 28 | 29 |
| Polylactic Acid Resin | NW 3001D | 100 | 100 | 100 | 100 | 100 | 100 | 100 | 100 | 100 | 100 | 100 | 100 | 100 | 100 |
| Crystal Nucleating Agent | Crystal Nucleating Agent-15 | 10.5 | — | — | — | — | — | — | — | — | — | — | 21.0 | — | — |
| | Crystal Nucleating Agent-16 | — | 10.5 | — | — | — | — | — | — | — | — | — | — | — | — |
| | Crystal Nucleating Agent-17 | — | — | 10.5 | — | — | — | — | — | — | — | — | — | — | — |
| | Crystal Nucleating Agent-18 | — | — | — | 10.5 | — | — | — | — | — | — | — | — | — | — |
| | Crystal Nucleating Agent-19 | — | — | — | — | 10.5 | — | — | — | — | — | — | — | — | — |
| | Crystal Nucleating Agent-20 | — | — | — | — | — | 10.5 | — | — | — | — | — | — | — | — |
| | Crystal Nucleating Agent-21 | — | — | — | — | — | — | 11.0 | — | — | — | 5.5 | — | 22.0 | — |
| | Crystal Nucleating Agent-22 | — | — | — | — | — | — | — | 12.0 | — | — | — | — | — | 18.0 |
| | Crystal Nucleating Agent-23 | — | — | — | — | — | — | — | — | 13.0 | — | — | — | — | — |
| | Crystal Nucleating Agent-24 | — | — | — | — | — | — | — | — | — | 20.5 | — | — | — | — |
| Plasticizer | (MeEO$_3$)$_2$SA | — | — | — | — | — | — | — | — | — | — | — | — | — | — |
| Evaluation of Polylactic Acid Resin Composition | Die Retention Time(s) at Die Temperature of 80° C. | 55 | 65 | 60 | 75 | 65 | 60 | 40 | 30 | 25 | 40 | 80 | 30 | 30 | 30 |
| | Die Retention Time(s) at Die Temperature of 70° C. | 85 | 90 | 90 | 100 | 90 | 90 | 65 | 50 | 40 | 60 | 115 | 40 | 35 | 35 |
| | Die Retention Time(s) at Die Temperature of 60° C. | 100 | 115 | 110 | 125 | 115 | 110 | 80 | 70 | 60 | 75 | ND | 55 | 50 | 50 |

Note)
Content of each of the raw materials is expressed by parts by weight, based on 100 parts by weight of the polylactic acid resin.
ND: not determined

TABLE 14

| Components of Polylactic Acid Resin Composition | | Examples | | | | | | | | | | |
|---|---|---|---|---|---|---|---|---|---|---|---|---|
| | | 30 | 31 | 32 | 33 | 34 | 35 | 36 | 37 | 38 | 39 | 40 |
| Polylactic Acid Resin | NW 3001D | 100 | 100 | 100 | 100 | 100 | 100 | 100 | 100 | 100 | 100 | 100 |
| Crystal Nucleating Agent | Crystal Nucleating Agent-25 | 10.5 | — | — | — | — | — | — | — | — | — | — |
| | Crystal Nucleating Agent-26 | — | 10.5 | — | — | — | — | — | — | — | — | — |
| | Crystal Nucleating Agent-27 | — | — | 10.5 | — | — | — | — | — | — | — | — |

TABLE 14-continued

| Components of Polylactic Acid Resin Composition | | Examples | | | | | | | | | | |
|---|---|---|---|---|---|---|---|---|---|---|---|---|
| | | 30 | 31 | 32 | 33 | 34 | 35 | 36 | 37 | 38 | 39 | 40 |
| | Crystal Nucleating Agent-28 | — | — | — | 10.5 | — | — | — | — | — | — | — |
| | Crystal Nucleating Agent-29 | — | — | — | — | 10.5 | — | — | — | — | — | — |
| | Crystal Nucleating Agent-30 | — | — | — | — | — | 10.5 | — | — | — | — | — |
| | Crystal Nucleating Agent-31 | — | — | — | — | — | — | 10.5 | — | — | — | — |
| | Crystal Nucleating Agent-32 | — | — | — | — | — | — | — | 10.5 | — | — | — |
| | Crystal Nucleating Agent-33 | — | — | — | — | — | — | — | — | 10.5 | — | — |
| | Crystal Nucleating Agent-34 | — | — | — | — | — | — | — | — | — | 10.5 | — |
| | Crystal Nucleating Agent-35 | — | — | — | — | — | — | — | — | — | — | 10.5 |
| Plasticizer | $(MeEO_3)_2SA$ | — | — | — | — | — | — | — | — | — | — | — |
| Evaluation of Polylactic Acid Resin Composition | Die Retention Time(s) at Die Temperature of 80° C. | 85 | 70 | 80 | 70 | 80 | 90 | 90 | 55 | 65 | 60 | 90 |
| | Die Retention Time(s) at Die Temperature of 70° C. | 120 | 95 | 115 | 95 | 115 | 120 | 120 | 85 | 90 | 90 | 120 |
| | Die Retention Time(s) at Die Temperature of 60° C. | ND | 120 | ND | 120 | ND | ND | ND | 100 | 115 | 110 | ND |

Note)
Content of each of the raw materials is expressed by parts by weight, based on 100 parts by weight of the polylactic acid resin.
ND: not determined

TABLE 15

| Components of Polylactic Acid Resin Composition | | Comparative Examples | | | | | | | | | | | |
|---|---|---|---|---|---|---|---|---|---|---|---|---|---|
| | | 13 | 14 | 15 | 16 | 17 | 18 | 19 | 20 | 21 | 22 | 23 | 24 |
| Polylactic Acid Resin | NW 3001D | 100 | 100 | 100 | 100 | 100 | 100 | 100 | 100 | 100 | 100 | 100 | 100 |
| Crystal Nucleating Agent | PY109 | 0.5 | — | — | — | — | — | — | — | — | — | — | — |
| | PY110 | — | 0.5 | — | — | — | — | — | — | — | — | — | — |
| | PR272 | — | — | 0.5 | — | — | — | — | — | — | — | — | — |
| | PR254(1) | — | — | — | 0.5 | — | — | — | — | — | — | — | — |
| | PR254(2) | — | — | — | — | 0.5 | — | — | — | — | — | — | — |
| | PV32 | — | — | — | — | — | 0.5 | — | — | — | — | — | — |
| | PR185 | — | — | — | — | — | — | 0.5 | — | — | — | — | — |
| | PR208 | — | — | — | — | — | — | — | 0.5 | — | — | — | — |
| | PB15:3 | — | — | — | — | — | — | — | — | 0.5 | — | — | — |
| | PB15 | — | — | — | — | — | — | — | — | — | 0.5 | — | — |
| | PB15:6 | — | — | — | — | — | — | — | — | — | — | 0.5 | — |
| | Vat Blue1 | — | — | — | — | — | — | — | — | — | — | — | 0.5 |
| Plasticizer | $(MeEO_3)_2SA$ | 10 | 10 | 10 | 10 | 10 | 10 | 10 | 10 | 10 | 10 | 10 | 10 |
| Evaluation of Polylactic Acid Resin Composition | Die Retention Time(s) at Die Temperature of 80° C. | 100 | 125 | 110 | 120 | 110 | 120 | 130 | 130 | 95 | 105 | 100 | 130 |
| | Die Retention Time(s) at Die Temperature of 70° C. | 130 | ND | ND | ND | ND | ND | ND | ND | 125 | 130 | 130 | ND |
| | Die Retention Time(s) at Die Temperature of 60° C. | ND | ND | ND | ND | ND | ND | ND | ND | ND | ND | ND | ND |

Note)
Content of each of the raw materials is expressed by parts by weight, based on 100 parts by weight of the polylactic acid resin.
ND: not determined

TABLE 16

| Components of Polylactic Acid Resin Composition | | Examples | | | | Comparative Examples | | | |
|---|---|---|---|---|---|---|---|---|---|
| | | 41 | 42 | 43 | 44 | 25 | 26 | 27 | 28 |
| Polylactic Acid Resin | NW 3001D | 100 | 100 | 100 | 100 | 100 | 100 | 100 | 100 |
| Crystal Nucleating Agent | Crystal Nucleating Agent-36 | 10.5 | — | — | — | — | — | — | — |
| | Crystal Nucleating Agent-37 | — | 10.5 | — | — | — | — | — | — |
| | Crystal Nucleating Agent-38 | — | — | 10.5 | — | — | — | — | — |
| | Crystal Nucleating Agent-39 | — | — | — | 10.5 | — | — | — | — |
| | T-1287 | — | — | — | — | 0.5 | — | — | — |
| | XyStUre | — | — | — | — | — | 0.5 | — | — |
| | 6-MeUra | — | — | — | — | — | — | 0.5 | — |
| | MC-6000 | — | — | — | — | — | — | — | 0.5 |
| Plasticizer | $(MeEO_3)_2SA$ | — | — | — | — | 10 | 10 | 10 | 10 |
| Evaluation of Polylactic Acid Resin Composition | Die Retention Time(s) at Die Temperature of 80° C. | 75 | 85 | 85 | 90 | 115 | 125 | 125 | 130 |
| | Die Retention Time(s) at Die Temperature of 70° C. | 100 | 120 | 120 | 120 | ND | ND | ND | ND |
| | Die Retention Time(s) at Die Temperature of 60° C. | 125 | ND | ND | ND | ND | ND | ND | ND |

Note)
Content of each of the raw materials is expressed by parts by weight, based on 100 parts by weight of the polylactic acid resin.
ND: not determined

TABLE 17

| Components of Polylactic Acid Resin Composition | | Examples | | | | | Comparative Examples | | | | |
|---|---|---|---|---|---|---|---|---|---|---|---|
| | | 45 | 46 | 47 | 48 | 49 | 29 | 30 | 31 | 32 | 33 |
| Polylactic Acid Resin | NW 3001D | 100 | 100 | 100 | 100 | 100 | 100 | 100 | 100 | 100 | 100 |
| Crystal Nucleating Agent | Crystal Nucleating Agent-40 | 10.5 | — | — | — | — | — | — | — | — | — |
| | Crystal Nucleating Agent-41 | — | 10.5 | — | — | — | — | — | — | — | — |
| | Crystal Nucleating Agent-42 | — | — | 10.5 | — | — | — | — | — | — | — |
| | Crystal Nucleating Agent-43 | — | — | — | 10.5 | — | — | — | — | — | — |
| | Crystal Nucleating Agent-44 | — | — | — | — | 10.5 | — | — | — | — | — |
| | SIP2MeBa | — | — | — | — | — | 0.5 | — | — | — | — |
| | NA-21 | — | — | — | — | — | — | 0.5 | — | — | — |
| | KM-1500 | — | — | — | — | — | — | — | 0.5 | — | — |
| | BTTCHA | — | — | — | — | — | — | — | — | 0.5 | — |
| | XBRA | — | — | — | — | — | — | — | — | — | 0.5 |
| Plasticizer | $(MeEO_3)_2SA$ | — | — | — | — | — | 10 | 10 | 10 | 10 | 10 |
| Evaluation of Polylactic Acid Resin Composition | Die Retention Time(s) at Die Temperature of 80° C. | 65 | 70 | 90 | 90 | 90 | 105 | 110 | 130 | 130 | 130 |
| | Die Retention Time(s) at Die Temperature of 70° C. | 90 | 95 | 120 | 120 | 120 | 130 | ND | ND | ND | ND |
| | Die Retention Time(s) at Die Temperature of 60° C. | 115 | 120 | ND | ND | ND | ND | ND | ND | ND | ND |

Note)
Content of each of the raw materials is expressed by parts by weight, based on 100 parts by weight of the polylactic acid resin.
ND: not determined

TABLE 18

| Components of Polylactic Acid Resin Composition | | Comparative Examples | | |
|---|---|---|---|---|
| | | 34 | 35 | 36 |
| Polylactic Acid Resin | NW 3001D | 100 | 100 | 100 |
| Crystal Nucleating Agent | Crystal Nucleating Agent-45 | 10.5 | — | — |
| | Crystal Nucleating Agent-46 | — | 10.5 | — |
| | Crystal Nucleating Agent-47 | — | — | 0.5 |
| Plasticizer | (MeEO$_3$)$_2$SA | — | — | 10.0 |
| Evaluation of Polylactic Acid Resin Composition | Die Retention Time(s) at Die Temperature of 80° C. | 135 | 105 | 100 |
| | Die Retention Time(s) at Die Temperature of 70° C. | ND | 130 | 130 |
| | Die Retention Time(s) at Die Temperature of 60° C. | ND | ND | ND |

Note)
Content of each of the raw materials is expressed by parts by weight, based on 100 parts by weight of the polylactic acid resin.
ND: not determined It can be seen from the results of Tables 11 and 12 that the polylactic acid resin compositions obtained according to the method of the present invention (Examples 1 to 13, 14, and 15) are capable of being molded in a short die retention time even at a die temperature of 60° C., so that the polylactic acid resin compositions have excellent crystallization velocities. On the other hand, the polylactic acid resin compositions of the comparative examples obtained by methods other than the method of the present invention were incapable of being molded within the same die retention time as those of Examples at any of the die temperatures of 60°, 70° and 80° C.

In addition, it can be seen from Tables 13 to 18 that the polylactic acid resin compositions obtained according to the method of the present invention (Examples 16 to 49) were capable of being molded in a short die retention time at die temperatures of 60° to 80° C., so that the polylactic acid resin compositions have excellent crystallization velocities. On the other hand, the polylactic acid resin compositions of the comparative examples obtained by methods other than the method of the present invention (Comparative Examples 13 to 36) were incapable of being molded within the same die retention time as those of Examples at any of the die temperatures of 60°, 70° and 80° C. It can be seen that even in polylactic acid resin compositions containing the same crystal nucleating agent, the crystallization velocities are remarkably improved by making the crystal nucleating agent finer in the presence of a carboxylic acid ester or a phosphoric ester in the present invention.

Next, the pellets of Examples 11 to 13 and Comparative Examples 10 to 12, and Example 27 and Comparative Example 37 were injection-molded with an injection molding machine (manufactured by The Japan Steel Works, Ltd., J75E-D) of which cylinder temperature was 200° C., into test pieces [flat plates (70 mm×40 mm×2 mm) and rectangular test pieces (125 mm×12 mm×6 mm)] in a die retention time of 30 seconds, to provide molded articles of polylactic acid resin compositions. The physical properties of the resulting molded articles were evaluated in accordance with the methods of the following Test Examples 1 to 2. The results are shown in Tables 19 and 20. Incidentally, Comparative Example 37 was prepared in the same manner as in Example 27 by blending 1.0 part by weight of PY109 and 20.0 parts by weight of (MeEO$_3$)$_2$SA, based on 100 parts by weight of the polylactic acid resin.

Test Example 1

Evaluation of Heat Resistance: Thermal Deformation Temperature

A thermal deformation temperature (° C.) at which a rectangular test piece (125 mm×12 mm×6 mm) was bowed for 0.25 mm at a load of 0.45 MPa was measured with a thermal deformation temperature measurement instrument (manufactured by Toyo Seiki, B-32) as prescribed in JIS-K7191. The higher this temperature, the more excellent the heat resistance.

Test Example 2

Evaluation of Crystallinity: Relative Crystallinity

A 7.5 mg sample was taken from a central portion of a flat plate (70 mm×40 mm×2 mm). Using a DSC apparatus (Diamond DSC, manufactured by Perkin-Elmer), the 1st RUN includes heating from 20° to 200° C. at a heating rate of 20° C./minute, keeping at 200° C. for 5 minutes, cooling from 200° to 20° C. at a cooling rate of −20° C./minute, and keeping at 20° C. for 1 minute, and further, the 2nd RUN includes heating from 20° to 200° C. at a heating rate of 20° C./minute. Using ΔHcc, which is an absolute value of a cold crystallization enthalpy of a polylactic acid resin observed in 1st RUN, and ΔHm, a melt crystallization enthalpy observed in 2nd RUN, the relative crystallinity can be calculated by the following formula:

Relative Crystallinity (%)=(ΔHm−ΔHcc)/ΔHm×100

TABLE 19

| Components of Polylactic Acid Resin Composition | | Examples | | | Comparative Examples | | |
|---|---|---|---|---|---|---|---|
| | | 11 | 12 | 13 | 10 | 11 | 12 |
| Polylactic Acid Resin | NW 3001D | 100 | 100 | 100 | 100 | 100 | 100 |
| Crystal Nucleating Agent | Crystal Nucleating Agent-1 | 21 | — | — | — | — | — |
| | Crystal Nucleating Agent-2 | — | — | — | — | — | — |
| | Crystal Nucleating Agent-3 | — | — | — | — | — | — |
| | Crystal Nucleating Agent-4 | — | 22 | — | — | — | — |
| | Crystal Nucleating Agent-5 | — | — | 18 | — | — | — |
| | Crystal Nucleating Agent-6 | — | — | — | — | — | — |
| | Crystal Nucleating | — | — | — | — | — | — |

TABLE 19-continued

| Components of Polylactic Acid Resin Composition | | Examples | | | Comparative Examples | | |
|---|---|---|---|---|---|---|---|
| | | 11 | 12 | 13 | 10 | 11 | 12 |
| | Agent-7 | — | — | — | — | — | — |
| | Crystal Nucleating Agent-8 | — | — | — | — | — | — |
| | Crystal Nucleating Agent-9 | — | — | — | — | — | — |
| | Crystal Nucleating Agent-10 | — | — | — | — | — | — |
| | Crystal Nucleating Agent-11 | — | — | — | — | — | — |
| | Crystal Nucleating Agent-12 | — | — | — | — | — | — |
| | PPA-Zn | — | — | — | 1.0 | 2.0 | 3.0 |
| | OHC18EB | — | — | — | — | — | — |
| Plasticizer | $(MeEO_3)_2SA$ | — | — | — | 20.0 | 20.0 | 15.0 |
| | DAIFATTY-101 | — | — | — | — | — | — |
| | $(AcEO_6)_3Gly$ | — | — | — | — | — | — |
| | Polyester-Polyol | — | — | — | — | — | — |
| | $(MeEO_3)_3HTC$ | — | — | — | — | — | — |
| Evaluation of Polylactic Acid Resin Composition | Thermal Deformation Temperature (° C.) | 87 | 90 | 95 | 39 | 40 | 42 |
| | Relative Crystallinity (%) | 93 | 96 | 100 | 51 | 55 | 60 |

Note)
Content of each of the raw materials is expressed by parts by weight, based on 100 parts by weight of the polylactic acid resin.

TABLE 20

| Components of Polylactic Acid Resin Composition | | Examples 27 | Comparative Examples 37 |
|---|---|---|---|
| Polylactic Acid Resin | NW 3001D | 100 | 100 |
| Crystal Nucleating Agent | Crystal Nucleating Agent-15 | 21 | — |
| | PY109 | — | 1.0 |
| Plasticizer | $(MeEO_3)_2SA$ | — | 20.0 |
| Evaluation of Polylactic Acid Resin Composition | Thermal Deformation Temperature (° C.) | 90 | 38 |
| | Relative Crystallinity (%) | 90 | 50 |

Note)
Content of each of the raw materials is expressed by parts by weight, based on 100 parts by weight of the polylactic acid resin.

From the results of Tables 19 and 20, the molded articles of the polylactic acid resin compositions of Examples molded at a die temperature of 30° C. and a die retention time of 30 seconds had a relative crystallinity of 90% or more and heat resistance of 80° C. or more. From the above, it is considered that the polylactic acid resin compositions of Examples 1 to 49 would have a relative crystallinity of 90% or more and heat resistance of 80° C. or more in the same test. On the other hand, the molded articles of the polylactic acid resin compositions of comparative examples obtained according to the methods other than the present invention were able to be demolded from the die, but had a low relative crystallinity of 60% or less, and had heat resistance of lower than 50° C.

INDUSTRIAL APPLICABILITY

The polylactic acid resin composition obtainable by the method of the present invention can be suitably used in various industrial applications, such as daily sundries, household electric appliance parts, packaging materials for household electric appliance parts, and automobile parts.

The invention claimed is:

1. A method for producing a polylactic acid resin composition, comprising the following steps (1) and (2):

step (1): subjecting an organic crystal nucleating agent to a wet pulverization in the presence of a phosphoric ester having a weight-average molecular weight of from 150 to 600 and a viscosity at 23° C. of from 1 to 500 mPa·s to give a finely pulverized organic crystal nucleating agent composition; and step (2): melt-kneading a raw material for a polylactic acid resin composition comprising the finely pulverized organic crystal nucleating agent composition obtained in the step (1) and a polylactic acid resin.

2. The method for producing a polylactic acid resin composition according to claim 1, wherein the organic crystal nucleating agent comprises at least one organic compound selected from the group consisting of metal salts of dialkyl aromatic sulfonates, metal salts of phosphoric esters, metal salts of phenylphosphonic acids, metal salts of rosin acids, aromatic carboxylic acid amides, and rosin acid amides.

3. The method for producing a polylactic acid resin composition according to claim 1, wherein the organic crystal nucleating agent comprises a metal salt of a phenylphosphonic acid.

4. The method for producing a polylactic acid resin composition according to claim 1, wherein the finely pulverized organic crystal nucleating agent composition has a volume-median particle size ($D_{50}$) of from 50 to 700 nm.

5. The method for producing a polylactic acid resin composition according to claim 1, wherein the step (1) comprises subjecting the organic crystal nucleating agent to a wet pulverization in the presence of the phosphoric ester, within a range satisfying a ratio of the weight of the organic crystal nucleating agent and a total weight of the phosphoric ester, that is the organic crystal nucleating agent/the phosphoric ester, of from 1/99 to 50/50.

6. The method for producing a polylactic acid resin composition according to claim 1, wherein the phosphoric ester comprises a compound represented by the formula (I):

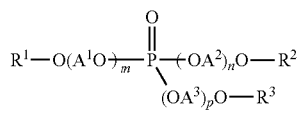

(I)

wherein each of $R^1$, $R^2$, and $R^3$ is independently an alkyl group having from 1 to 4 carbon atoms; each of $A^1$, $A^2$, and $A^3$ is independently an alkylene group having 2 or 3 carbon atoms; each of m, n, and p is independently a positive number representing an average number of moles added for the oxyalkylene group, wherein m+n+p is a number that exceeds 3 and is equal to or less than 12.

7. The method for producing a polylactic acid resin composition according to claim 6, wherein m+n+p in the formula (I) is a number that exceeds 4 and is less than 12.

8. The method for producing a polylactic acid resin composition according to claim 1, wherein the phosphoric ester is one or more members selected from the group consisting of tris(ethoxyethoxyethyl)phosphate, tris(methoxyethoxyethyl) phosphate, tris(propoxyethoxyethyl)phosphate, tris(butoxyethoxyethyl)phosphate, tris(methoxyethoxyethoxyethyl) phosphate, tris(ethoxyethoxyethoxyethyl)phosphate, bis(ethoxyethoxyethyl)methoxyethoxyethoxyethyl phosphate and bis(methoxyethoxyethyl)ethoxyethoxyethyl phosphate.

9. The method for producing a polylactic acid resin composition according to claim 1, wherein the organic crystal nucleating agent subjected to the wet pulverization has a volume-median particle size ($D_{50}$) of from 500 nm to 5 μm.

10. The method for producing a polylactic acid resin composition according to claim 1, wherein the treatment temperature for the wet pulverization is from 5° to 250° C.

11. The method for producing a polylactic acid resin composition according to claim 1, wherein the organic crystal nucleating agent is wet pulverized in step (1) with a media pulverizer.

12. The method for producing a polylactic acid resin composition according to claim 1, wherein in the step (2) the finely pulverized organic crystal nucleating agent composition obtained in the step (1) is contained in an amount of from 1 to 50 parts by weight, based on 100 parts by weight of the polylactic acid resin.

* * * * *